(12) United States Patent
Folsom et al.

(10) Patent No.: US 9,524,283 B2
(45) Date of Patent: Dec. 20, 2016

(54) TECHNIQUES TO REMOTELY ACCESS FORM INFORMATION AND GENERATE A FORM

(75) Inventors: Todd C. Folsom, Cary, NC (US); Scott Paul Leslie, Chapel Hill, NC (US)

(73) Assignee: SAS INSTITUTES INC., Cary, NC (US)

( * ) Notice: Subject to any disclaimer, the term of this patent is extended or adjusted under 35 U.S.C. 154(b) by 0 days.

(21) Appl. No.: 13/221,681

(22) Filed: Aug. 30, 2011

(65) Prior Publication Data

US 2013/0055060 A1  Feb. 28, 2013

(51) Int. Cl.
| | | |
|---|---|---|
| G06F 17/00 | (2006.01) | |
| G06F 17/24 | (2006.01) | |
| G06F 17/22 | (2006.01) | |

(52) U.S. Cl.
CPC ......... G06F 17/243 (2013.01); G06F 17/2247 (2013.01)

(58) Field of Classification Search
CPC .............. G06F 17/30864; G06F 17/243; G06F 17/30657; G06F 17/30554
USPC .......................... 715/221, 222, 224, 225, 226
See application file for complete search history.

(56) References Cited

U.S. PATENT DOCUMENTS

| | | | | |
|---|---|---|---|---|
| 7,716,590 | B1 * | 5/2010 | Nathan | ............. G06F 17/30899 715/738 |
| 8,055,997 | B2 * | 11/2011 | Gagnon | ........................ 715/222 |
| 8,127,224 | B2 * | 2/2012 | Vincent, III | ................... 715/222 |
| 2003/0101414 | A1 | 5/2003 | Liu et al. | |
| 2004/0039990 | A1 * | 2/2004 | Bakar et al. | ................... 715/505 |
| 2006/0080596 | A1 | 4/2006 | Bhogal et al. | |
| 2006/0107224 | A1 * | 5/2006 | Friend et al. | ................. 715/764 |
| 2006/0136810 | A1 | 6/2006 | Truong et al. | |
| 2008/0027642 | A1 * | 1/2008 | Winberry et al. | ............ 701/212 |
| 2008/0235567 | A1 * | 9/2008 | Raj et al. | ....................... 715/226 |
| 2010/0138239 | A1 * | 6/2010 | Reicher et al. | ................ 715/222 |
| 2010/0218092 | A1 * | 8/2010 | Xiang et al. | ................... 715/273 |

(Continued)

OTHER PUBLICATIONS

Hsueh, et al., "Dynamic Prompts Make Data Cascading Easy: Introducing New Features in SAS 9.2 Prompt Framework", Paper 355-2009, Mar. 22, 2009, 18 pages, SAS Institute, Inc., Cary, NC.

(Continued)

Primary Examiner — Ariel Mercado

(57) ABSTRACT

Techniques to remotely access form information are described. An apparatus may comprise a logic device and an application having a form manager component operative on the logic device to manage one or more forms for a user interface of the application. The form manager component may be arranged to generate a form with form information retrieved from a web service using a form information query. The form information query may comprise a data structure having static form configuration information, dynamic form configuration information, or a combination of static form configuration information and dynamic form configuration information. The dynamic form configuration information may have one or more dynamic form parameters used to retrieve information from the web service. The dynamic form parameters may be dynamically generated during runtime operation of the application. Other embodiments are described and claimed.

25 Claims, 26 Drawing Sheets

(56) References Cited

U.S. PATENT DOCUMENTS

2010/0251092 A1* 9/2010 Sun .............................. 715/222
2011/0238437 A1* 9/2011 Zhou et al. ...................... 705/2
2011/0271173 A1* 11/2011 Ait-Mokhtar ......... G06F 17/243
715/226

OTHER PUBLICATIONS

Davidson, et al., "Using Dynamic and Cascading Prompts in SAS Enterprise Guide", Apr. 11, 2010, 18 pages, SAS Institute, Inc., Cary, NC.

* cited by examiner

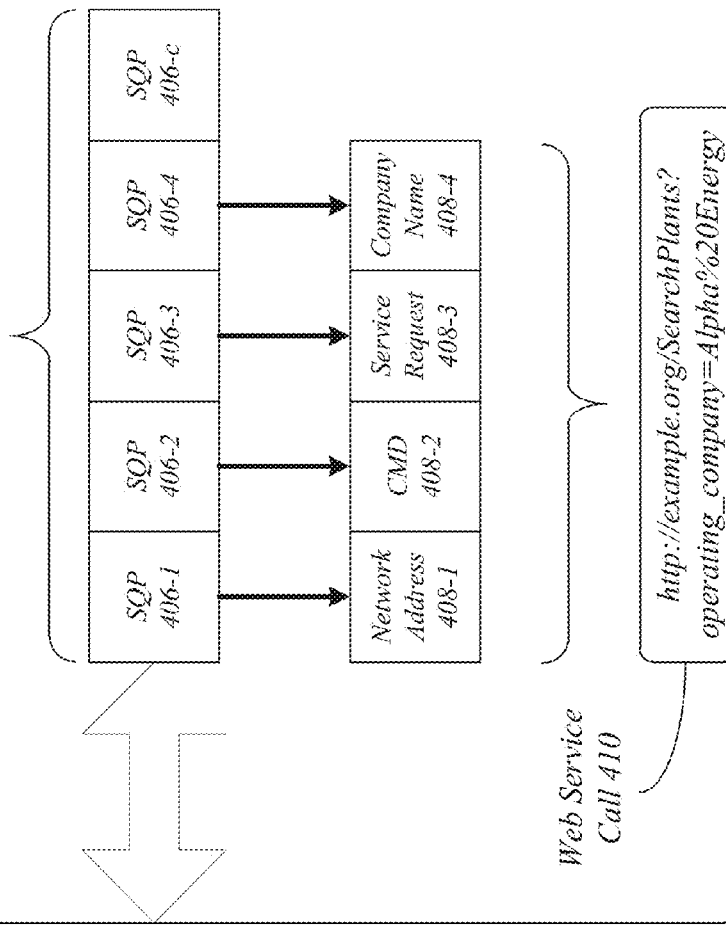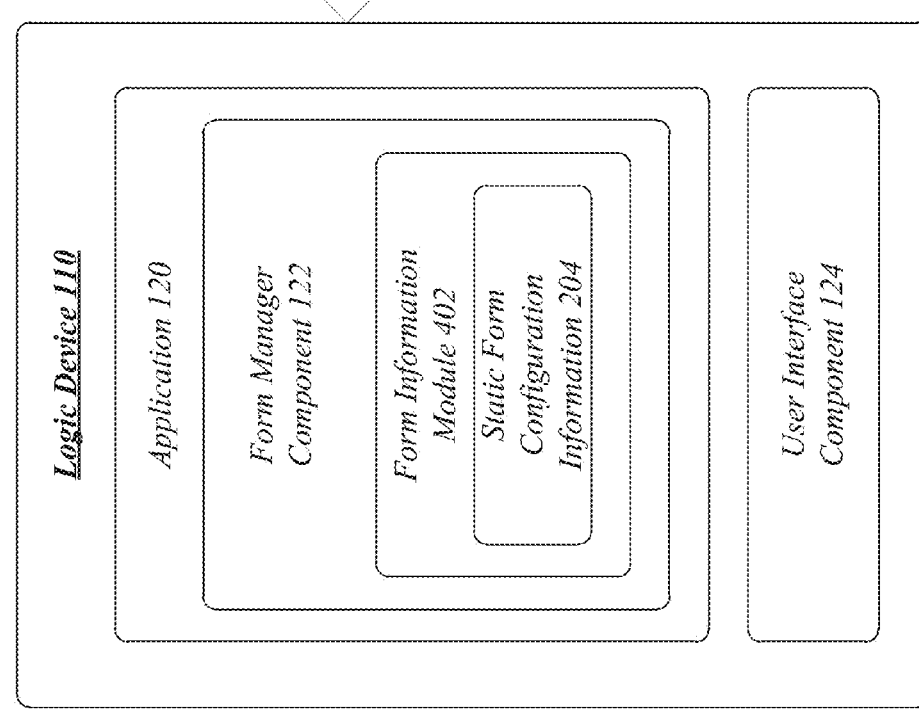
FIG. 4

*1100*

GENERATE A FORM FOR A USER INTERFACE OF AN APPLICATION
1102

GENERATE A FORM INFORMATION QUERY FOR THE FORM, THE FORM INFORMATION QUERY COMPRISING A DATA STRUCTURE HAVING STATIC FORM CONFIGURATION INFORMATION, DYNAMIC FORM CONFIGURATION INFORMATION, OR A COMBINATION OF STATIC FORM CONFIGURATION INFORMATION AND DYNAMIC FORM CONFIGURATION INFORMATION
1104

SEND THE FORM INFORMATION QUERY TO A WEB SERVICE
1106

RECEIVE FORM INFORMATION IN RESPONSE TO THE FORM INFORMATION QUERY FROM THE WEB SERVICE
1108

PRESENT THE FORM INFORMATION IN A FIELD OF THE FORM ON THE USER INTERFACE OF THE APPLICATION
1110

*FIG. 11*

Table 1900

| Values 1902 | Labels 1904 |
|---|---|
| 14500000.0000 | MARSHALL (NC) |
| 13300000.0000 | BELEWS CREEK |
| 6949546.0000 | ALLEN (NC) |
| 4199413.0000 | CLIFFSIDE |
| 2390418.0000 | RIVERBEND (NC) |
| 1803198.0000 | BUCK (NC) |
| 1656246.0000 | LEE (SC) |
| 1230601.0000 | DAN RIVER |
| 129365.6016 | LINCOLN COUNTY |
| 81881.2734 | BUZZARD ROOST |
| 70363.4297 | MILL CREEK (SC) |
| 61292.8008 | ROCKINGHAM COUNTY |

FIG. 19

TECHNIQUES TO REMOTELY ACCESS FORM INFORMATION AND GENERATE A FORM

BACKGROUND

A user interface is a system by which people (users) interact with an electronic device, such as a computer. In general, a user interface allows users to input information to manipulate an electronic device. A user interface also allows an electronic device to output information as to the effects of the manipulation. In computing, a graphical user interface (GUI) is a type of user interface that allows users to interact with electronic devices with images rather than text commands. A GUI represents the information and actions available to a user through graphical icons and visual indicators such as secondary notation, as opposed to text-based interfaces, typed command labels or text navigation. The actions are usually performed through direct manipulation of the graphical elements.

A form is a type of GUI view that is specifically designed to allow a user to enter data in a structured manner for processing by an electronic device. A form provides an input template comprising various combinations of checkboxes, radio buttons, text fields, and other GUI elements designed to query and display data. This type of form is sometimes referred to as an "electronic form" to distinguish it from its physical counterpart, such as a paper document with blank spaces for insertion of required or requested information.

Conventional electronic forms typically present a list or column of valid values for certain fields so that the user can be prompted to select a value. These values may either come from a static data source or a dynamic data source. A static data source, such as a list, may be encoded in an application program as source code during development prior to compilation as an executable file. Use of a static data source for a form makes changing values of the static list difficult, and in some cases, technically infeasible. Dynamic data sources of values are typically different application programs, such as databases or spreadsheets that can be edited by a user or form designer. For instance, a spreadsheet may have a series of cells, with each cell holding a value for presentation in a value list for a field of a form. When a user changes a value of a given cell in the spreadsheet, the value list reflects the change when presented by a field of the form. In many cases, a dynamic data source is implemented in a same device as an application generating a form. This type of implementation severely limits a number of dynamic data sources and forces a user to manage a given dynamic data source. In some cases, a dynamic data source is implemented in a different device as an application generating a form. For instance, a web form on a web page allows a user to enter data that is sent to a web service implemented on a server for processing. In some cases, a web form can present values in a field of the web form that are stored by the server. However, similar to static lists, a web form is limited to a static query of the web service that must be specified at design time. It is with respect to these and other considerations that the present improvements are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

One embodiment may be implemented as an apparatus comprising a logic device and an application having a form manager component operative on the logic device to manage one or more forms for a user interface of the application. The form manager component may be arranged to generate a form with form information retrieved from a web service using a form information query. The form information query may comprise a data structure having static form configuration information, dynamic form configuration information, or a combination of static form configuration information and dynamic form configuration information. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates an embodiment of a dynamic form system in a third operating environment.

FIG. 11 illustrates an embodiment of a first logic flow.

FIG. 19 illustrates an embodiment of a table for a dynamic form system.

DETAILED DESCRIPTION

Figure 1:
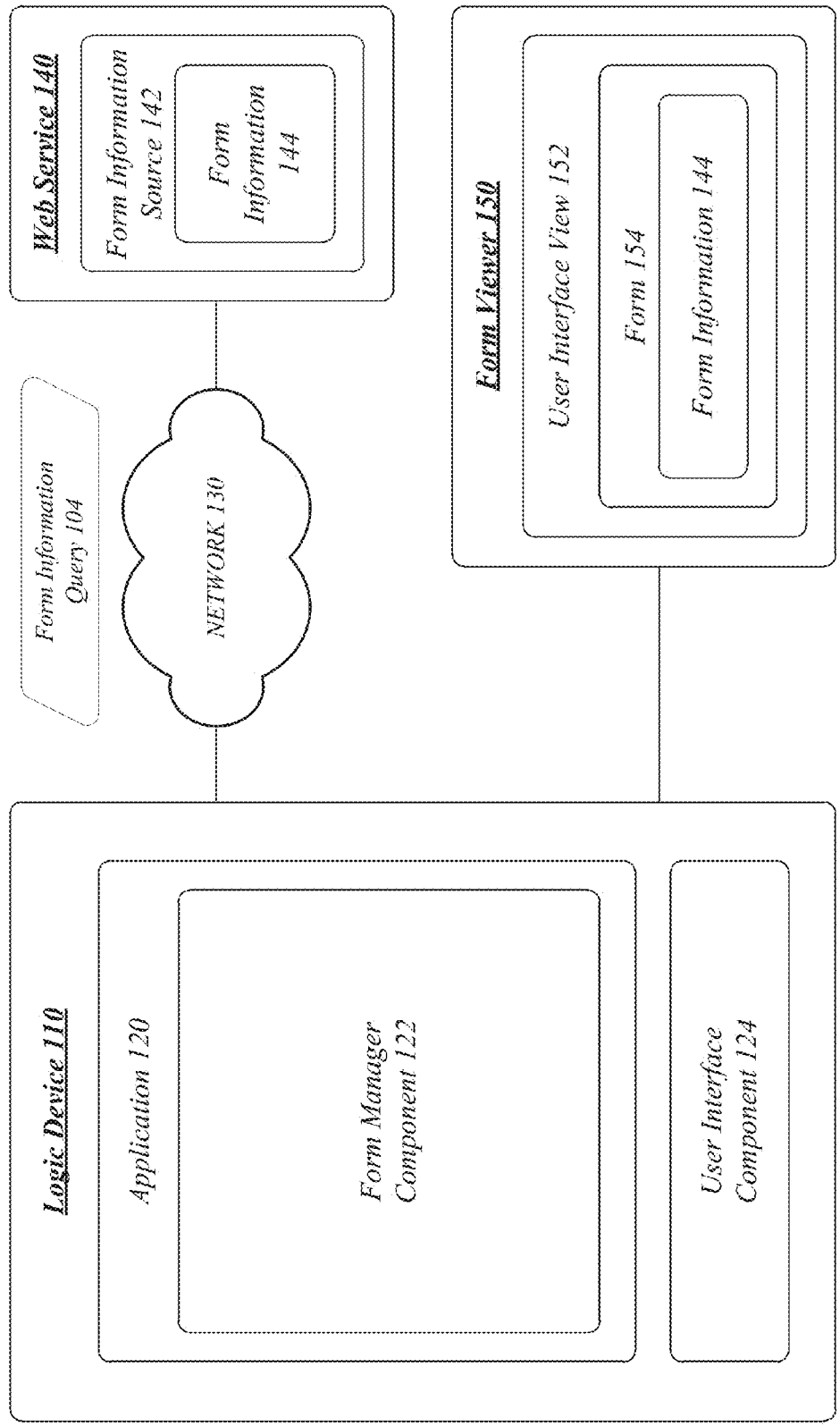
FIG. 1 illustrates an embodiment of a dynamic form system.

Embodiments are generally directed to enhanced form management techniques to remotely access form information for an electronic form generated as part of a user interface for an application. Some embodiments are particularly directed to enhanced form management techniques arranged to allow a form generated by an application executing on a client device to obtain form information for the form from a dynamic data source located on a server device, such as a web service, during execution of the application generating the form. The dynamic data source may store static form information or dynamic form information suitable for presentation in one or more fields of an electronic form.

A remote dynamic data source, such as a web service, tends to be multi-purpose and therefore is capable of returning a lot of information fields. The enhanced form management techniques allow for extracting a set of form values and associated data (e.g., label fields) from that plethora of information. A form designer of a field prompt using a web service for values will supply configuration information as properties of the enhanced form management technique. This information may include, for example, a uniform resource location (URL) of a web service, one or more query statements (e.g., extensible markup language (XML) path language (XPATH) style statements), namespaces (e.g., XML namespaces), security parameters, proxy or firewall parameters, a software architecture for the web service (e.g., SOAP or REST), and so forth. Configuration options may vary depending upon a particular web service style selected for a given implementation. The enhanced form management techniques also provide a unique data structure for the configuration information.

The enhanced form management techniques use the supplied configuration information (e.g., XPATH statements and XML namespaces) to extract values from the form information (e.g., XML document) returned by the web service at runtime. Because form values can be represented as either XML elements or attributes, the enhanced form management techniques support extracting from many different software architectures.

The enhanced form management techniques provide several advantages over conventional form management techniques. For instance, the use of a dynamic data source located remotely from the application generating the form allows for remote or third-party management of form information, thereby reducing or eliminating the burden of form value management from a user or form developer. This also facilitates software updates by allowing changes to static or dynamic form information in a centralized location rather than modifying a distributed number of application programs or devices. In another example, the use of a dynamic data source allows for up-to-date form information for a given form, thereby providing robust and timely form values for the given form and the application generating the form. In yet another example, rather than limiting a form designer to a static query of a web service that must be specified at design time, the enhanced form management techniques allow for dynamic queries based on other values specified in the form and on heuristically derived values from the user's computer or mobile device. The form designer can supply a form information query with designated places for substitution parameters. The enhanced form management techniques may then supply the substitution values which will be placed into the form information query, where designated, before calling the web service. In still another example, the XML resulting from conventional web service queries is all read as text even though some of the results should be considered as numbers, dates, times, or other non-text values. The enhanced form management techniques allow a form designer to specify a data type for the returned values. This data type can then be used to coerce the data returned from the web service into a standard form for that data type. By examining the data type, a viewer can display the values in a suitable format. It may be appreciated that other advantages exist as well.

FIG. 1 illustrates a block diagram for a dynamic form system 100 designed to implement various enhanced form management techniques for designing and implementing interactive GUI forms for different software programs. The dynamic form system 100 may be implemented as part of a computing system or communications system, examples of which are described in more detail with reference to respective FIGS. 25, 26. Although the dynamic form system 100 as shown in FIG. 1 has a limited number of elements in a certain topology, it may be appreciated that the dynamic form system 100 may include more or less elements in alternate topologies as desired for a given implementation.

In various embodiments, the dynamic form system 100 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

In various embodiments, the dynamic form system 100 may be implemented by one or more electronic devices each having computing and/or communications capabilities. Example computing devices may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a mainframe computer, a supercomputer, a network appliance, a web appliance, multiprocessor systems, processor-based systems, or any combination thereof. The embodiments are not limited in this context.

In various embodiments, components and/or modules of the dynamic form system 100, and any electronic devices implementing some or all of the components and/or modules of the dynamic form system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the dynamic form system 100 may be implemented as part of a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced interactive form techniques, it may be appreciated that the enhanced interactive form techniques may be implemented by a single computing device as well. The embodiments are not limited in this context.

In the illustrated embodiment shown in FIG. 1, the dynamic form system 100 comprises a logic device 110 and a web service 140 communicatively coupled by a network 130. The logic device 110 may further comprise an application 120 and a user interface component 124. The application 120 may further comprise a form manager component 122. The web service 140 may further comprise a form information source 142 having one or more sets of form information 144. The dynamic form system 100 may further comprise a form viewer 150, with the form viewer 150 arranged to present a user interface view 152, a form 154 and various amounts of form information 144.

The logic device 110 may comprise any electronic device capable of executing a defined set of logic. In one embodiment, the logic device 110 may comprise a processing system. The processing system may comprise, for example, a general purpose processor or a special purpose processor and one or more memory units, as described in more detail with reference to FIG. 26. The embodiments, however, are not limited in this context.

The application 120 may comprise any application program that generally allows a user to accomplish one or more specific tasks. In various implementations, the application 120 may provide a graphical user interface (GUI) to communicate information between the application 120 and a user via an output device, such as an electronic display. Examples of applications 120 may include without limitation information technology (IT) management applications, human resource management applications, financial management applications, business intelligence applications, customer relationship management applications, report generating applications, statistical analysis applications, business planning applications, project management applications, productivity applications, word processing applications, spreadsheet applications, database applications, and so forth. In one embodiment, for example, the application 120 may be implemented as one or more SAS® software application programs made by SAS Institute Inc., Cary, N.C., such as SAS/Management Console, SAS Information Map Studio, SAS Web Report Studio, Business Intelligence (BI) Dashboard, and so forth. The embodiments, however, are not limited to these examples.

The form manager component 122 may be operative on the logic device 110 to generate, modify, or otherwise manage one or more forms 154 for the application 120. In one embodiment, the forms 154 may be implemented as part of a user interface view 152 of the application 120.

A form 154 is a type of GUI view, or portion of a GUI view, that is specifically designed to allow a user to enter data in a structured manner for processing by the logic device 110. A form 154 provides an input template comprising various GUI elements, such as checkboxes, radio buttons, text fields, and other GUI elements designed to query and present data for a user. Similar to a paper form, a form 154 may comprise a combination of GUI elements arranged in a defined pattern to solicit requested or required information from a user. In one embodiment, a form 154 may comprise one or more fields capable of receiving or presenting values of different data types (e.g., text, numbers, symbols, etc.). In one embodiment, a form 154 may comprise one or more fields each capable of presenting a list or column of valid form values for the respective field. A user may then select a form value from the list of the form values to populate a respective field. In one embodiment, for example, the lists of form values may be stored by a dynamic data source, such as the web service 140.

The form manager component 122 may be generally arranged to generate a form 154 with form information 144 retrieved from a web service 140 using a form information query 104. The form information query 104 may comprise a data structure having, among other types of information, static form configuration information, dynamic form configuration information, or a combination of static form configuration information and dynamic form configuration information. The form information query 104, and associate types of information, may be described in more detail with reference to FIGS. 2-10.

In various embodiments, the user interface component 124 may generally provide a user interface, such as a GUI, for the application 120. The user interface component 124 may be implemented natively as part of the application 120, or as part of another software program, such as an operating system (OS) or other system program. In one embodiment, the user interface component 124 may be operative on the logic device 110 to generate the user interface view 152 with the form 154 and the received form information 144 in the form 154 for presentation on an electronic display.

The network 130 may communicate information between the logic device 110 and the web service 140, as well as any other network devices connected to the network 130. The network 130 may comprise any type of private or public network, including packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). Further, the network 130 may be implemented as a wired network, a wireless network, or a combination of both.

When implemented as a wired network, for example, the network 130 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless network, for example, the network 130 may include one or more wireless elements arranged to communicate information over one or more types of wireless communication media. An example of wireless communication media may include portions of a wireless spectrum, such as the radio-frequency (RF) spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

The web service 140 may comprise any software system designed to support interoperable machine-to-machine interaction over the network 130. In one embodiment, the web service 140 has an interface described in a machine-processable format, such as a web services description language (WSDL) format. Other systems interact with the web service 140 in a manner prescribed by its description using simple object access protocol (SOAP) messages, typically conveyed using hypertext transfer protocol (HTTP) with an XML serialization in conjunction with other web-related standards. The web service 140 may use different classes of web services. Two major classes of web services may include representational state transfer (REST)-compliant web services, in which the primary purpose of the service is to manipulate XML representations of web resources using a uniform set of "stateless" operations, and arbitrary web services, in which the service may expose an arbitrary set of operations. The web service 140 may implement web services using a number of different techniques, including without limitation remote procedure call (RPC) techniques, service-oriented architecture (SOA) techniques, and REST techniques. The embodiments are not limited in this context.

In various embodiments, the web service 140 may comprise one or more form information sources 142. Each of the form information sources 142 may comprise dynamic data sources storing various types of form information 144. The form information sources 142 may be implemented using various database technologies, such as a database management system (DBMS). The form information 144 may comprise any defined multimedia information suitable for presentation in a given form 154, including media content, voice information, video information, audio information, image information, textual information, numerical information, alphanumeric symbols, graphics, and so forth.

In various embodiments, the form viewer 150 is arranged to present a form 154 as part of a user interface view 152. The form viewer 150 may be implemented as part of the logic device 110 or some other electronic device. In one embodiment, the form viewer 150 may comprise software integrated with the application 120, or implemented as a separate stand-alone software program. Additionally or alternatively, the form viewer 150 may comprise an electronic device having specialized viewing software. In one embodiment, the form viewer 150 may be operative on the logic device 110 to present the user interface view 152 with the form 154 and the received form information 144 in the form 154 on the electronic display.

The form manager component 122 may be used for two general classes of operations. The first class of operation is associated with designing a form 154 for use with the application 120. This includes designing a specific instance of a form information query 104 to retrieve form information 144 from the web service 140. The first class of operations is typically performed in response to control directives received from a form designer of a given form 154. The second class of operation is associated with using the form information query 104 defined during the design phase to make a web service call to retrieve form information 144 for the form 154 from the web service 140 at run-time of the application 120, and presenting the web information 144 on an electronic display. The second class of operations is typically performed in response to control directives received from a user of a given form 154.

In a model-view-controller (MVC) design pattern of the application 120, the form manager component 122 is part of the model. Any user interface view 152 can be implemented to allow configuration of properties of the form manager component 122 and for displaying its results. Setting properties and obtaining results may be accomplished via one or more application programming interfaces (APIs) provided by the form manager component 122 (or associated libraries).

The form manager component 122 may support a number of different types of web services techniques. In one embodiment, for example, the form manager component 122 is arranged to support both the REST and SOAP style of web service calls. Some configuration options may vary for each style so the form manager component 122 provides correspondingly different data schemas for each style. Each data schema can handle the settings that are common to either style of web service call. In this case, the form manager component 122 provides two concrete subclasses with an API suitable for setting the options of each style.

Figure 2:
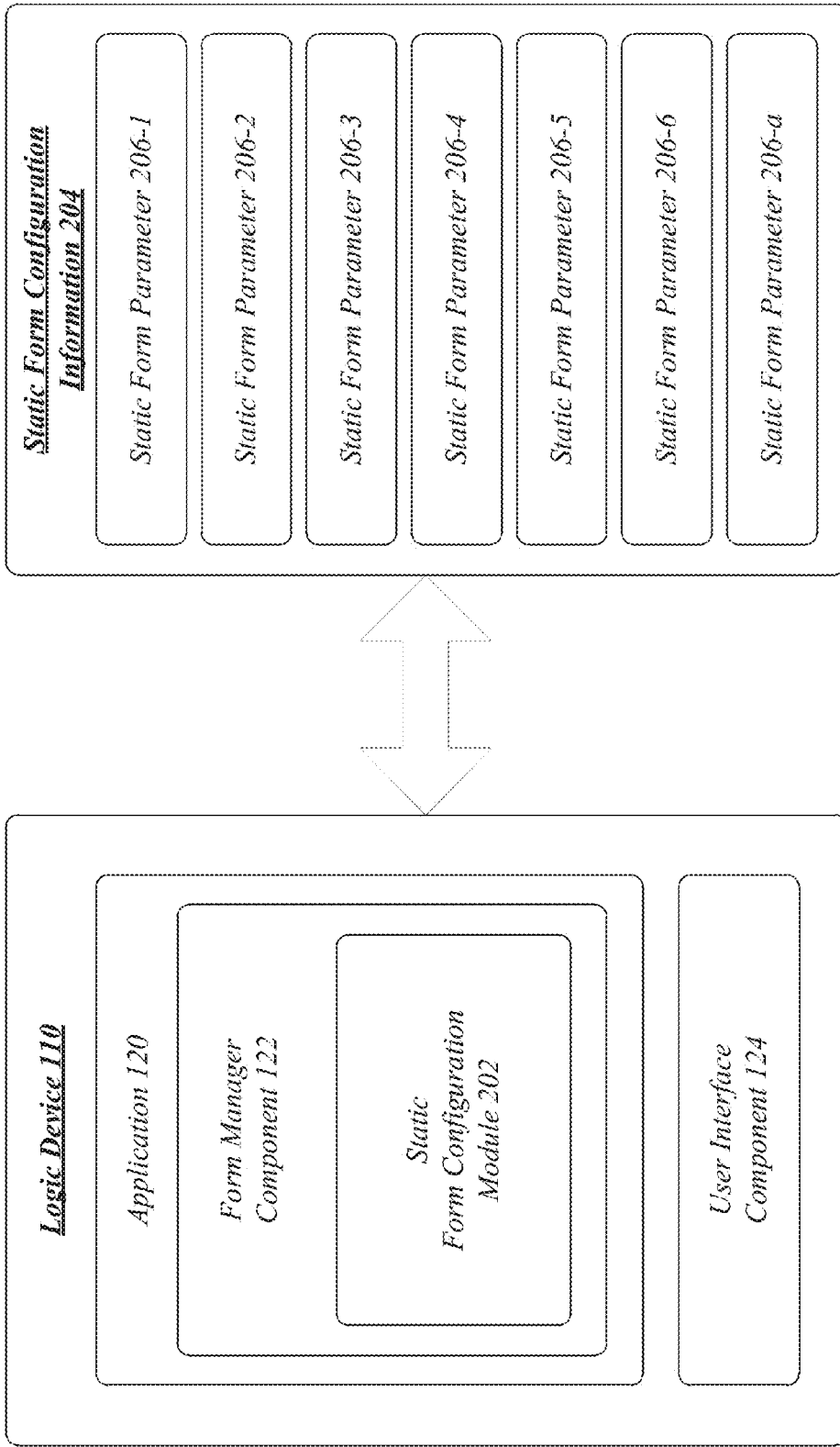
FIG. 2 illustrates an embodiment of a dynamic form system in a first operating environment.

FIG. 2 illustrates an embodiment of the dynamic form system 100 in an operating environment 200. In the illustrated embodiment shown in FIG. 2, the form manager component 122 may implement a static form configuration module 202 operative on the logic device 110 to define static form configuration information 204.

The static form configuration information 204 may comprise one or more static form parameters 206-$a$ used to retrieve form information 144 from the web service 140. The static form parameters 206-$a$ are configuration parameters that normally do not change during run-time operation of the application 120 and/or the form manager component 122. As such, the static form parameters 206-$a$ are typically stored before the application 120 and/or the form manager component 122 is executing on the logic device 110. For instance, the static form parameters 206-*a* may be stored as part of a configuration file for a form 154 during the design phase of the form 154.

It is worthy to note that "a" and "b" and "c" and similar designators as used herein are intended to be variables representing any positive integer. Thus, for example, if an implementation sets a value for a=5, then a complete set of static form parameters 206-*a* may include static form parameters 206-1, 206-2, 206-3, 206-4 and 206-5. The embodiments are not limited in this context.

Figure 3:
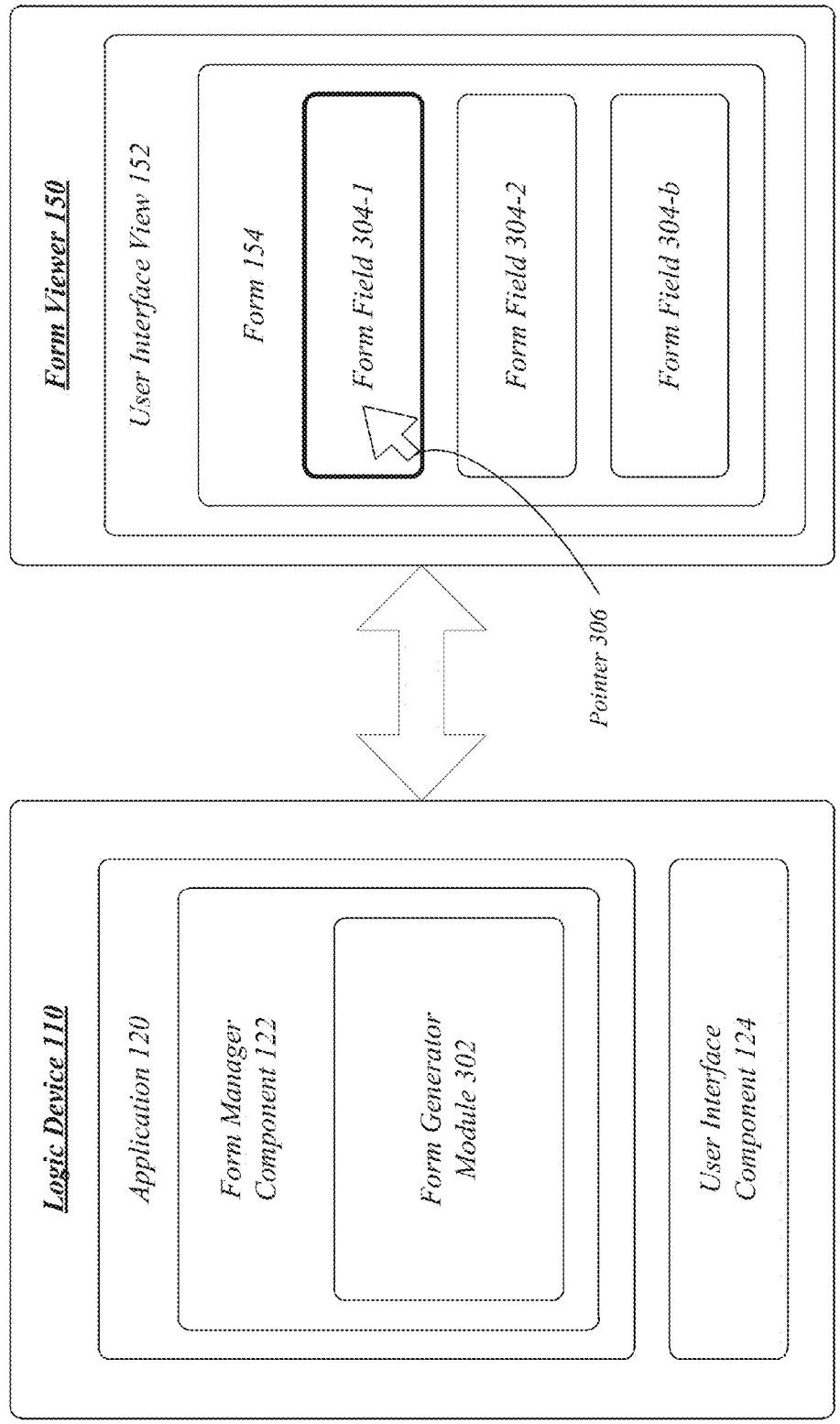
FIG. 3 illustrates an embodiment of a dynamic form system in a second operating environment.

FIG. 3 illustrates an embodiment of the dynamic form system 100 in an operating environment 300. In the illustrated embodiment shown in FIG. 3, the form manager component 122 may implement a form generator module 302 operative on the logic device 110. The form generator module 302 may be generally arranged to generate one or more forms 154 for a user interface view 152 of the application 120. A form 154 may comprise various GUI elements, including one or more form fields 304-*b* capable of presenting different sets of form information 144. The form fields 304-*b* may be selected by a user via a pointing device, as represented by the pointer 306. For instance, FIG. 3 illustrates a user manipulating an input device to move the pointer 306 to select the form field 304-1, as indicated by the bolded border around the form field 304-1.

FIG. 4 illustrates an embodiment of the dynamic form system 100 in an operating environment 400. In the illustrated embodiment shown in FIG. 4, the form manager component 122 may comprise or implement a form information module 402 operative on the logic device 110 to generate a form information query 404. The form information query 404 may be an exemplary implementation for the form information query 104 as described with reference to FIG. 1. The form information query 404 may be arranged to retrieve form information 144 for a form field 304-*b* of a form 154 from the web service 140 using the static form configuration information 204.

In various embodiments, the static form configuration information 204 may comprise one or more static query parameters 406-*c*. The static query parameters 406-*c* may represent parameters that typically do not change over time or during run-time of the application 120. As such, the static query parameters 406-*c* may be hard-coded parameter values provided by a form designer during a design phase for a form 154, such as network information, web service information, form information, form field information, and so forth. As shown in FIG. 4, examples of static query parameters 406-*c* for a form information query 404 may include without limitation a network address 408-1 for the web service 140, a command (CMD) 408-2 comprising a control directive for the web service 140, a service request identifier (ID) 408-3 indicating a web service style, and a company name 408-4 comprising form field information. It may be appreciated that the form information query 404 may include other static query parameters 406-*c* as well. The embodiments are not limited in this context.

In operation, the form information module 402 may retrieve the static query parameters 406-*c* of the static form configuration information 204, and generate a web service call 410 to the web service 140. For instance, as shown in FIG. 4, a web service call 410 may comprise:

http://example.org/
SearchPlants?operating_company=Alpha%20Energy

In this example, the web service call 410 may include a URL and a parameter designed to return values for "operating_company" that is "Alpha Energy." The form manager component 122 may use the web service call 410 to retrieve form information 144 from the web service 140 over the network 130.

Figure 5:
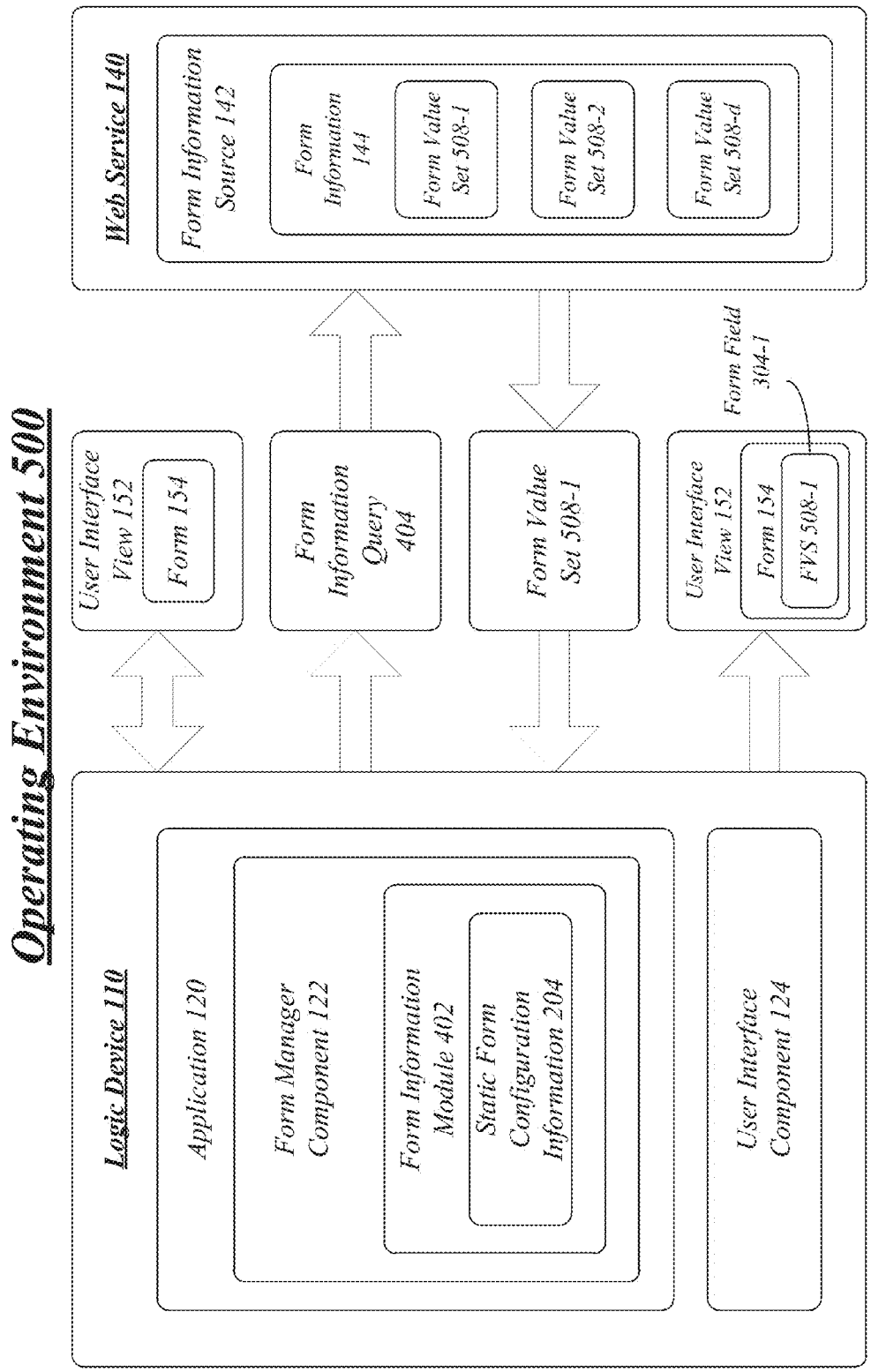
FIG. 5 illustrates an embodiment of a dynamic form system in a fourth operating environment.

FIG. 5 illustrates an embodiment of the dynamic form system 100 in an operating environment 500. The operating environment 500 may illustrate a case where the form manager component 122 retrieves form information 144 from the web service 140 using the form information query 404. The form information query 404 may be arranged to retrieve form information 144 for a first form field 304-1 of the form 154 from the web service 140 using the static form configuration information 204. The form information module 402 may be arranged to receive the form information 144 comprising a first form value set 508-1 from the web service 140 for presentation in the first form field 304-1 of the form 154.

In the illustrated embodiment shown in FIG. 5, the form manager component 122 of the application 120 may generate a form 154 presented as part of a user interface view 152 generated by the user interface component 124. A user may select a form field 304-1 of the form 154 via the pointer 306 as illustrated in FIG. 3. The form manager component 122 may implement the form information module 402 operative on the logic device 110 to generate the form information query 404 as described with reference to FIG. 4, and send the form information query 404 to the web service 140.

The web service 140 may receive the form information query 404, and retrieve form information 144 from a form information source 142 in response to the form information query 404. The form information 144 may comprise one or more form value sets 508-*d*. The web service 140 may retrieve a form value set 508-1 from among the form value sets 508-*d*, and send the form value set 508-1 to the logic device 110. The form manager component 122 may receive the form value set 508-1, and present one or more form values from the form value set 508-1 in the form field 304-1 of the form 154 in the user interface view 152.

Figure 6:
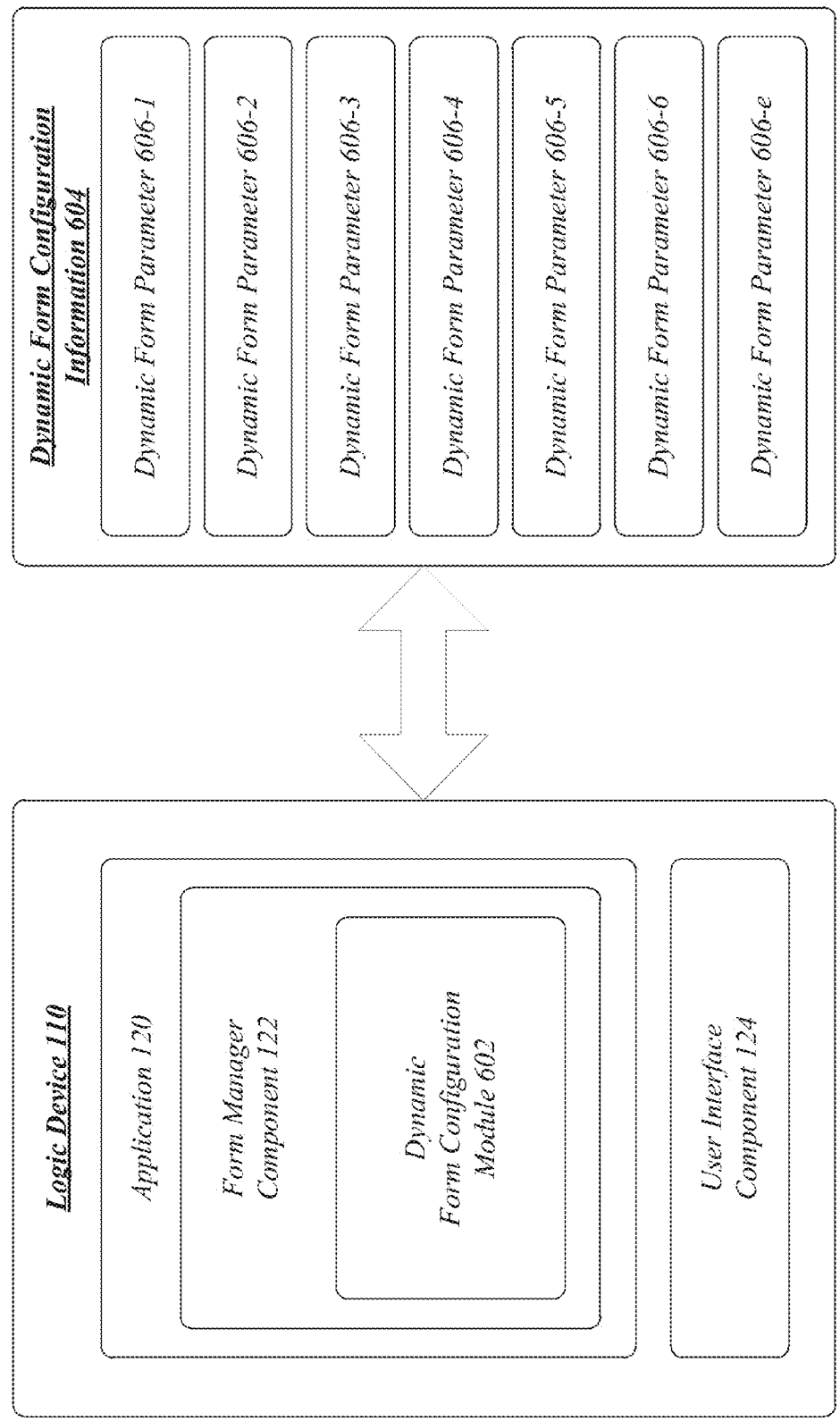
FIG. 6 illustrates an embodiment of a dynamic form system in a fifth operating environment.

FIG. 6 illustrates an embodiment of the dynamic form system 100 in an operating environment 600. In the illustrated embodiment shown in FIG. 6, the form manager component 122 may implement a dynamic form configuration module 602 operative on the logic device 110 to define dynamic form configuration information 604 in a form of one or more dynamic form parameters 606-*e* used to retrieve form information 144 from the web service 140. The form manager component 122 may be arranged to dynamically retrieve the dynamic form parameters 606-*e* during runtime when the application 120 is executing on the logic device 110.

The dynamic form configuration information 604 may comprise one or more dynamic form parameters 606-*e* used to retrieve form information 144 from the web service 140. The dynamic form parameters 606-*e* are configuration parameters that can change during run-time operation of the application 120 and/or the form manager component 122. As such, the dynamic form parameters 606-*e* do not need to be stored before the application 120 and/or the form manager component 122 is executing on the logic device 110 (e.g., during the design phase of the form 154). For instance, a dynamic form parameter 606-*e* may be predicated on user control directives when selecting certain form information 144, such as a form value from the form value set 508-1 previously retrieved by the form manager component 122 and presented in the form field 304-1. In another example, a dynamic form parameter 606-*e* may be predicated on a current location for the logic device 110. Other examples are described in more detail below, and the embodiments are not limited in this context.

Figure 7:
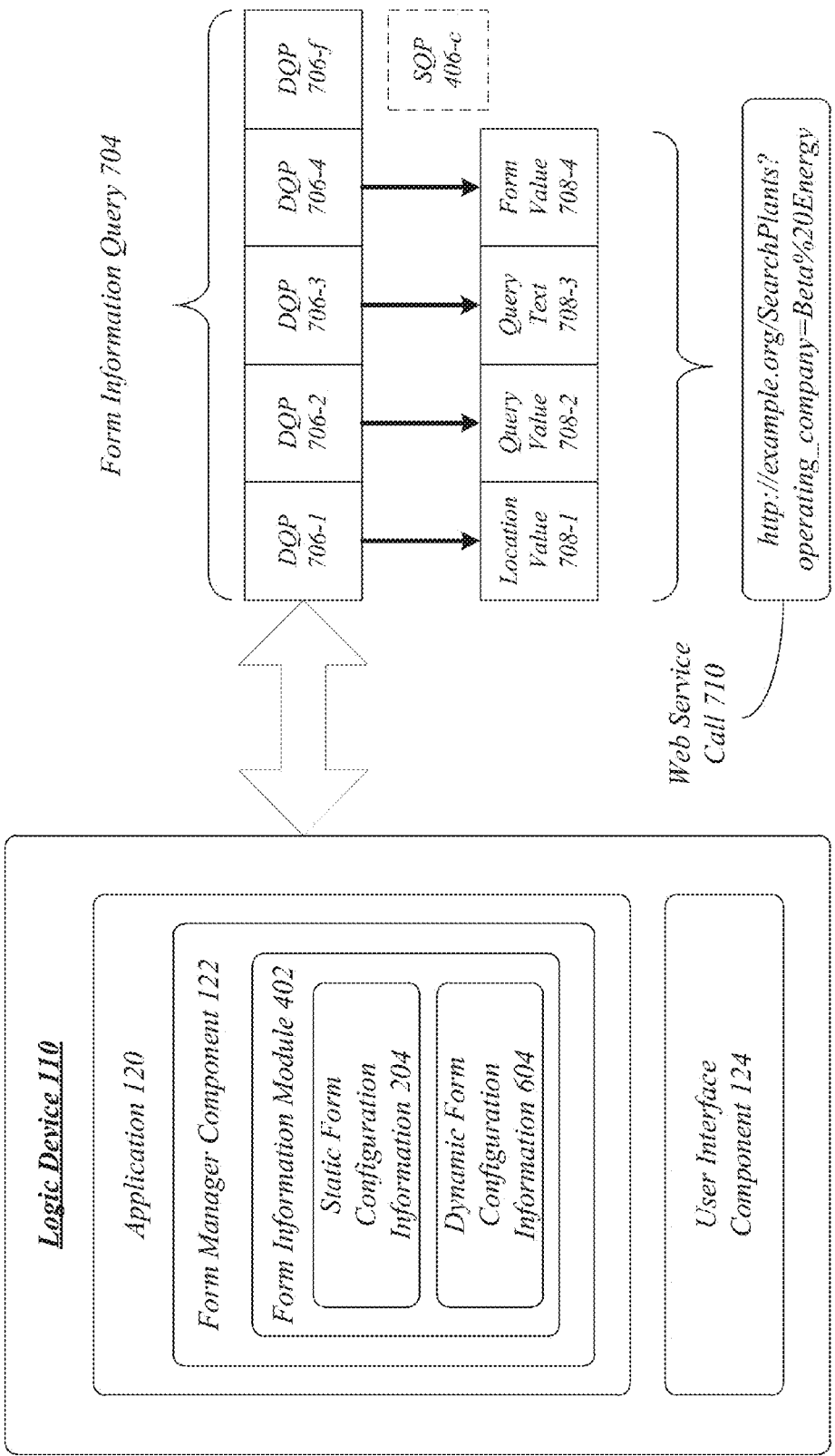
FIG. 7 illustrates an embodiment of a dynamic form system in a sixth operating environment.

FIG. 7 illustrates an embodiment of the dynamic form system 100 in an operating environment 700. In the illustrated embodiment shown in FIG. 7, the form manager component 122 may comprise the form information module 402 operative to generate a form information query 704. The form information query 704 may be an exemplary implementation of the form information query 104. The form information query 704 may be arranged to retrieve form information 144 for a form field 304-*b* of the form 154 from the web service 140 using the dynamic form configuration information 604.

In various embodiments, the dynamic form configuration information may comprise one or more dynamic query parameters 706-*f*. The dynamic query parameters 706-*f* may represent parameters that typically do change over time or during run-time of the application 120. As such, the dynamic query parameters 706-*f* may not necessarily be hard-coded parameter values provided by a form designer during a design phase for a form 154. As shown in FIG. 7, examples of dynamic query parameters 706-*f* for a form information query 704 may include without limitation a location value 708-1 for the logic device 110, a query value 708-2 for the form information query 704, a query text 708-3 for the form information query 704, and a form value 708-4 comprising form value for the form 154. It may be appreciated that the form information query 704 may include other dynamic query parameters 706-*f* as well. The embodiments are not limited in this context.

In operation, the form information module 402 may retrieve the dynamic query parameters 706-*f* of the dynamic form configuration information 604, and generate a web service call 710 to the web service 140. For instance, as shown in FIG. 7, a web service call 710 may comprise:

http://example.org/
SearchPlants?operating_company=Beta%20Energy

In this example, the web service call 710 may include a URL and a parameter designed to return values for "operating_company" that is "Beta Energy," where "Beta Energy" is a form value 708-4 that was selected by a user and provided to the form manager component 122 during run-time of the application 120. The form manager component 122 may use the web service call 710 to retrieve form information 144 from the web service 140 over the network 130.

Additionally or alternatively, the form information query 704 may retrieve form information 144 for a form field 304-*b* of the form 154 from the web service 140 using a combination of static form configuration information 204 and dynamic form configuration information 604. Along with one or more dynamic query parameters 706-*f*, the form information query 704 may optionally include one or more static query parameters 406-*c*.

Figure 8:
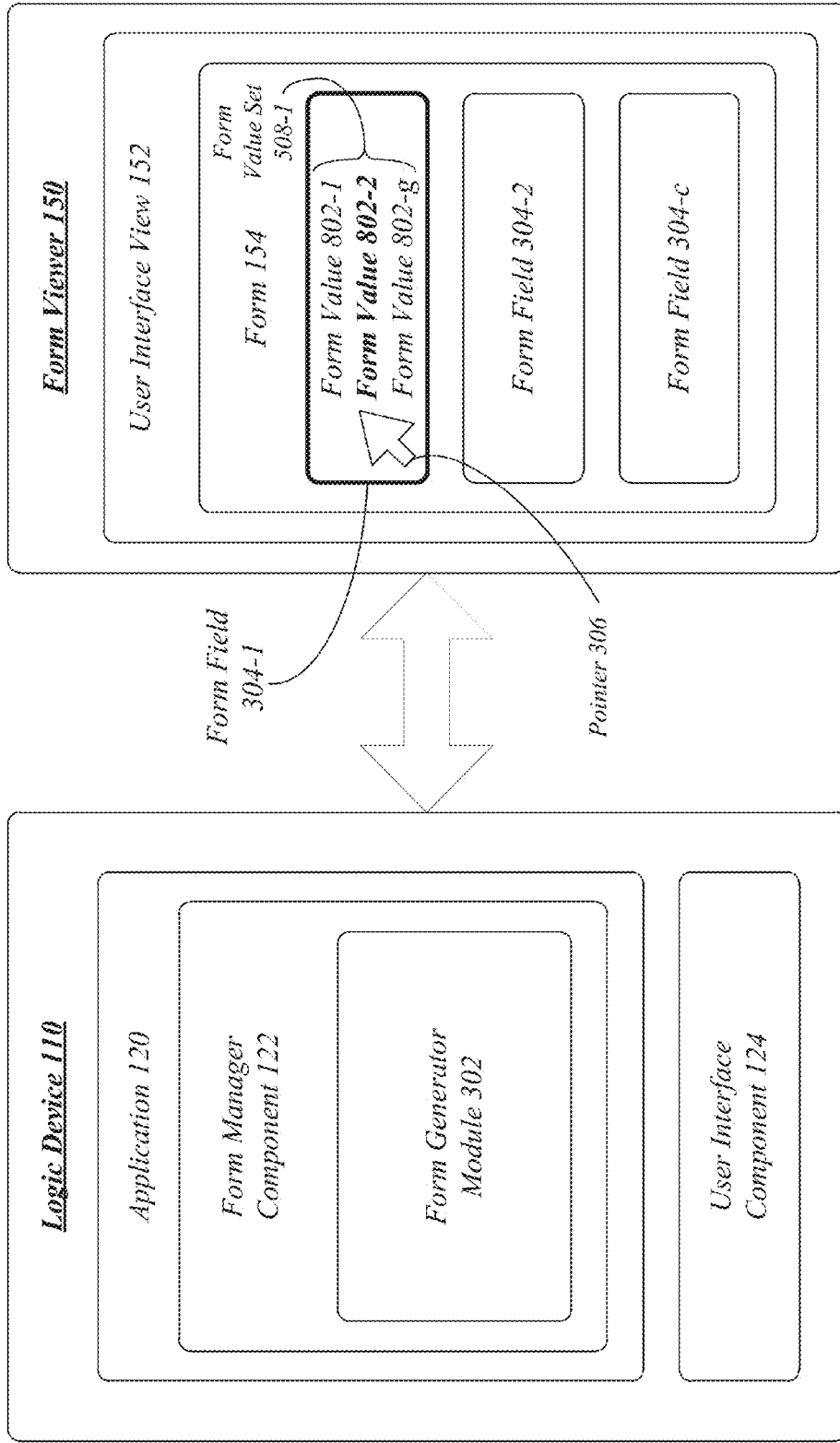
FIG. 8 illustrates an embodiment of a dynamic form system in a seventh operating environment.

FIG. 8 illustrates an embodiment of the dynamic form system 100 in an operating environment 800. In the illustrated embodiment shown in FIG. 8, the form manager component 122 may implement the form generator module 302 operative on the logic device 110 to generate a form 154 for the user interface view 152 of the application 120. The form 154 may comprise various GUI elements, including one or more form fields 304-*b* capable of presenting different sets of form information 144. For instance, FIG. 8 illustrates a form field 304-1 presenting a form value set 508-1 having multiple form values 802-*g*. The form value set 508-1 for the form 154 may have been previously retrieved by the form manager component 122 as described with reference to FIG. 5. Each of the form fields 304-*b* may be selected via a pointing device, as represented by the pointer 306. For instance, FIG. 8 illustrates a user manipulating an input device to move the pointer 306 to select the form field 304-1. As shown, the user may select a particular form value 802-*g* from the form value set 508-1 via the pointer 306, such as the form value 802-2 bolded in the form field 304-1.

Figure 9:
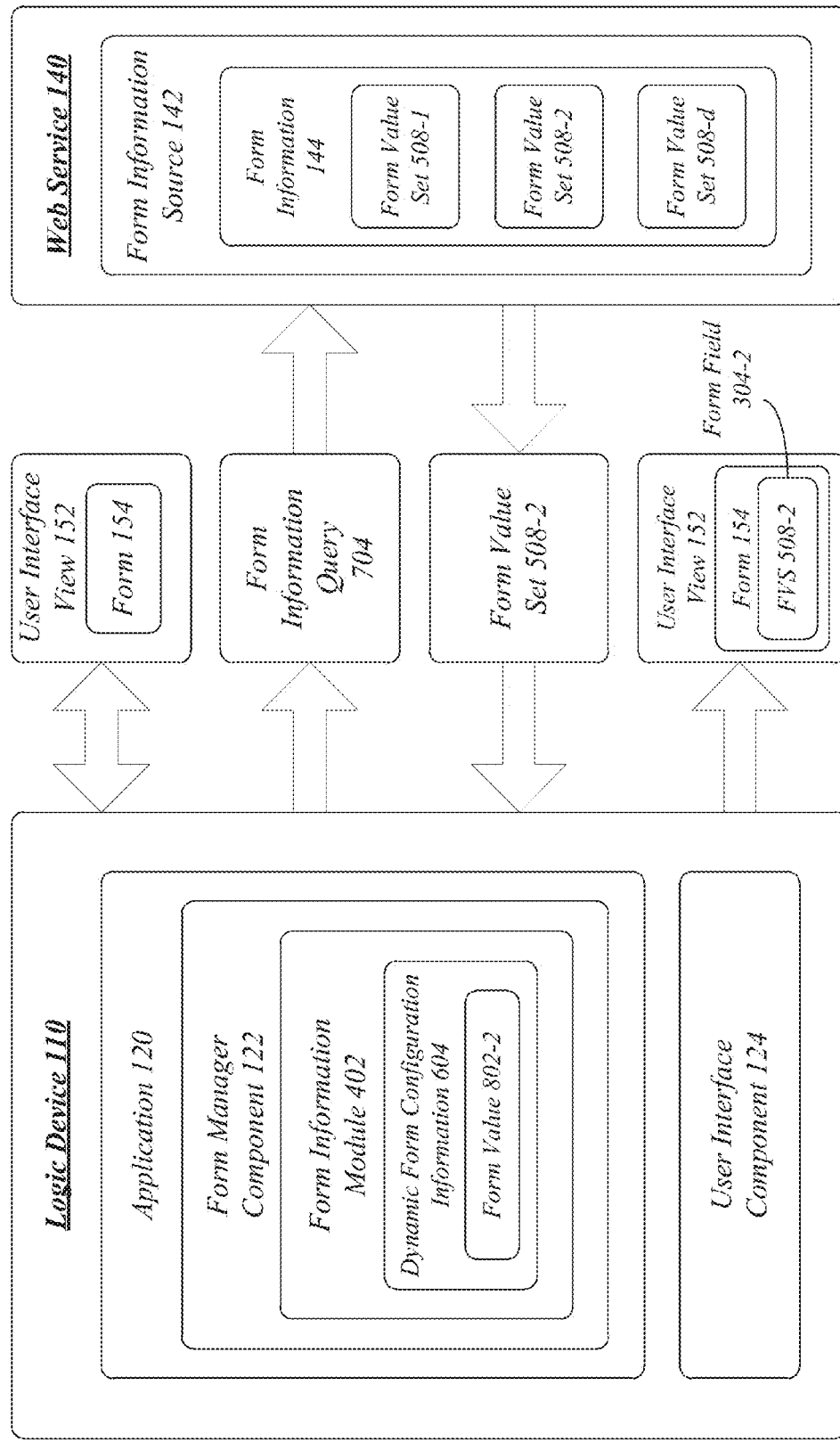
FIG. 9 illustrates an embodiment of a dynamic form system in an eighth operating environment.

FIG. 9 illustrates an embodiment of the dynamic form system 100 in an operating environment 900. In the illustrated embodiment shown in FIG. 9, the form manager component 122 may comprise the form information module 402 operative on the logic device 110 to send the form information query 704 arranged to retrieve form information 144 for a second form field 304-2 of the form 154 from the web service 140 using the dynamic form configuration information 604.

In one embodiment, the dynamic form configuration information 604 may comprise a form value 802-2 from a first form value set 508-1 of a first form field 304-1 of the form 154. The form information module 402 may receive the form information 144 comprising a second form value set 508-2 from the web service 140 for presentation in the second form field 304-2 of the form 154.

In the illustrated embodiment shown in FIG. 8, the form manager component 122 of the application 120 may generate the form 154 presented as part of the user interface view 152 generated by the user interface component 130. A user may select a form value 802-2 from a first form value set 508-1 of a first form field 304-1 of the form 154 as illustrated in FIG. 8. The form manager component 122 may implement the form information module 402 operative on the logic device 110 to generate the form information query 704 with the form value 802-2 as a dynamic query parameter 706-*f* (e.g., a form value 708-4) as described with reference to FIG. 7, and send the form information query 704 to the web service 140.

The web service 140 may receive the form information query 704, and retrieve form information 144 from a form information source 142 in response to the form information query 404. The form information 144 may comprise one or more form value sets 508-*d*. The web service 140 may retrieve a form value set 508-2 from among the form value sets 508-*d*, and send the form value set 508-2 to the logic device 110. The form manager component 122 may receive the form value set 508-2, and present one or more form values from the form value set 508-2 in the form field 304-2 of the form 154 in the user interface view 152.

Figure 10:
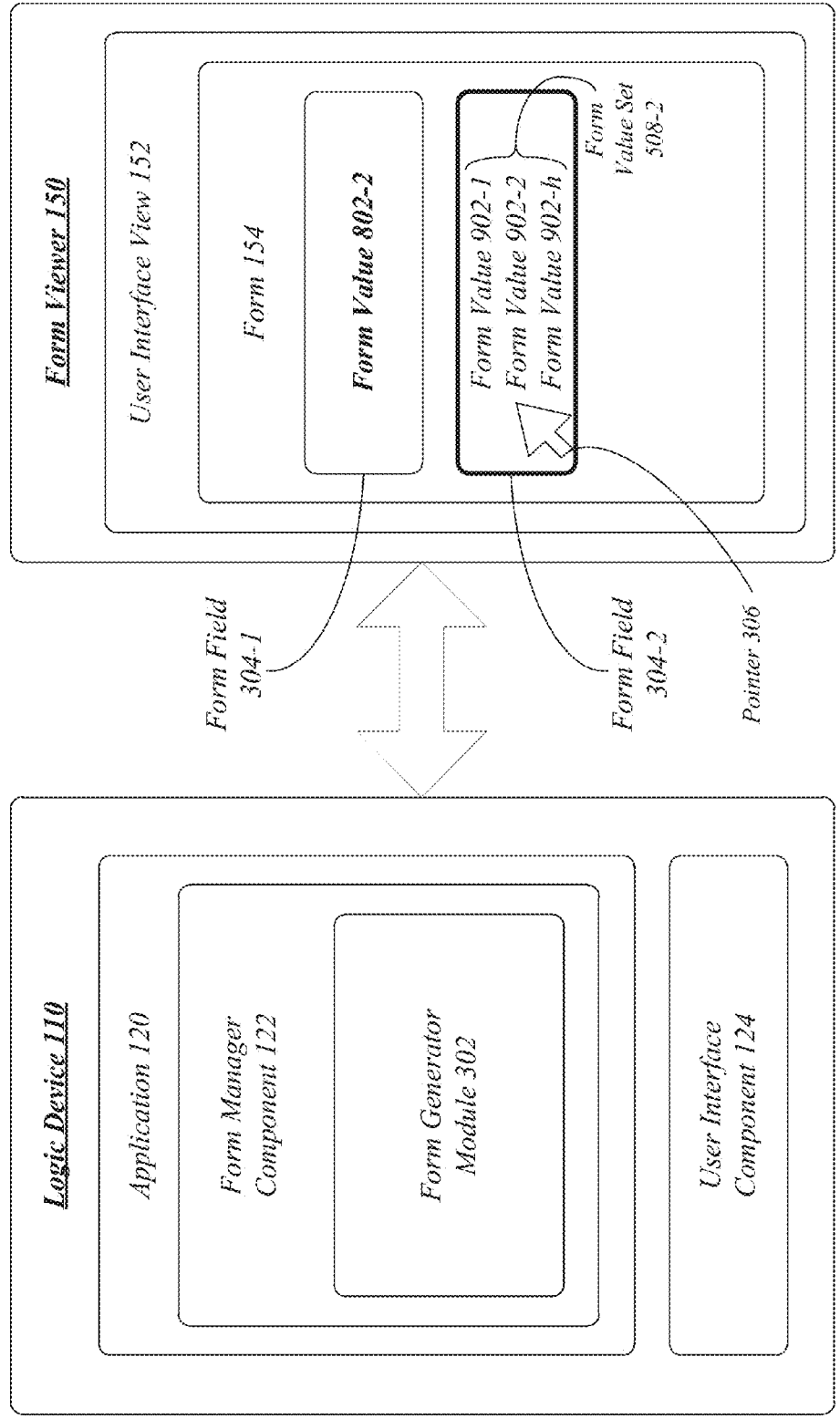
FIG. 10 illustrates an embodiment of a dynamic form system in an ninth operating environment.

FIG. 10 illustrates an embodiment of the dynamic form system 100 in an operating environment 1000. The form manager component 122 may implement the form generator module 302 operative on the logic device 110 to generate a form 154 for the user interface view 152 of the application 120. The form 154 may comprise various GUI elements, including one or more form fields 304-*b* capable of presenting different sets of form information 144. For instance, FIG. 10 illustrates a form field 304-1 presenting a form value 802-2 selected by a user via the pointer 306 from the first form value set 508-1. Further, FIG. 10 illustrates a form field 304-2 presenting a second form value set 508-2 comprising form values 902-*h* retrieved using the form value 802-2 presented in the form field 304-1.

In the illustrated embodiment shown in FIG. 10, the form viewer 150 illustrates a user interface view 152 having the form 154 with the form value 802-2 presented in the form field 304-1, as previously selected by a user via pointer 306 as described with reference to FIG. 8, and a list of form values 902-*h* from the value set 508-2 in the form field 304-2, as previously retrieved from the web service 140 via the form information query 704 with the form value 802-2 as described with reference to FIG. 9. A user may then select one of the form values 902-*h*, and repeat retrieval operations for a next form field 304-3. These operations may continue for as many nested levels of the form fields 304-*b* as desired for a given implementation. The embodiments are not limited in this context.

Form Design Phase

As previously described, different forms 154 may be designed and coded by various form designers during a form design phase. The enhanced form management techniques may include a software development kit (SDK) and/or software library comprising a collection of resources used to develop a form 154. The SDK and/or software library may include application programming interfaces (APIs), pre-written code and subroutines, classes, values or type specifications useful in form design.

During the form design phase, an initial determination is made regarding a web services style used by the form manager component 122 for a given web service 140. Exemplary web services styles include REST-style web services and SOAP-style web services. The form manager component 122 may generate different form information queries 104 for each web service style.

For REST-style web services, a form designer may define a set of static form parameters 206-*a* needed for REST-style web service call. The first static form parameter 206-1 needed is an endpoint URL for the web service 140. The static form parameter 206-1 may comprise a network address 408-1 of the web service 140 that will return the form information 144. The URL may contain a query with one or more parameters and values. An example of this (similar to the web service call 410) is shown as follows:

http://example.org/
searchPlants?operating_company=Duke%20Energy

The URL may include a second static query parameter 406-2 comprising a CMD 408-2 of "searchPlants?," where the portion after the question mark is a single parameter with a value after the equals sign. In this example the form designer has supplied a hard-coded parameter value such that the query will always return values for "operating_company" that is "Duke Energy." Next the form designer must specify a static query parameter 406-3 for a service request 408-3, such as whether to use the HTTP GET or HTTP POST method. This parameter defines how the service request is made.

For SOAP-style web services, three static query parameters 406-*c* are needed for a SOAP-style service call. The form designer needs to provide: (1) the endpoint reference; (2) the SOAP message; and (3) the action to invoke upon the web service 140. The action is defined by the WSDL of the web service 140 that will be invoked.

As described with reference to FIGS. 6, 7, the form manager component 122 may provide a substitution string as defined by one or more dynamic query parameters 706-*f* for any value in an endpoint URL or value in a SOAP message at run-time of the application 120 rather than being a hard-coded constant supplied by the form designer during the design phase. One possible implementation is for a form designer to represent a substituted value as a field by a special delimiter character ("A") in front of the name. For example, assume the following web service endpoint:

www.colourlovers.com/api/colors&hueRange=ˆhueLo,
ˆhueHi

In this web service endpoint, there is a parameter, hueRange, that takes two values. Because the form designer specified ˆhueLo and ˆhueHi as fields, those values can be substituted with user selections at run-time rather than being limited to hard-coded hues supplied by the form designer.

The form manager component 122 may provide these user-selections at run-time. The form manager component 122 accepts a collection of fields and values as defined by the dynamic query parameters 706-*f* for query substitution into its storage structure. The dynamic query parameters 706-*f* will be used at run-time to match up user selections in a form 154 with the appropriate fields identified by the special delimiter character in the endpoint URL or SOAP message so that proper substitution occurs. The form manager component 122 provides URL encoding of the query values in case values contain blanks or other characters that are invalid in a URL. Continuing with the above-referenced example, if the collection of user-selected values contains ˆhueLo=blue and ˆhueHigh=purple, the form manager component 122 will send a service endpoint request of www.colourlovers.com/api/colors&hueRange=blue,
purple Where the fields ˆhueLo and ˆhueHi are replaced with respective blue and purple.

In addition to the above, a form designer needs to supply some additional static query parameters 406-*c* and/or dynamic query parameters 706-*f* that are common to both REST-style and SOAP-style web services, as follows:

1. A form designer may set an XPATH expression for a values column. Optionally, the form designer may set the attribute for values in case the values are defined in an XML attribute rather than XML element text (e.g., the attribute information is stored separately from the XPATH). The form designer may then set header text that a viewer may use to display over the values column. The XPATH expression is used at run-time to extract values from the XML returned by the web service calls 410, 710.
2. The form designer may optionally set a collection of namespaces so that the XPATH resolution will work when the XML contains namespace declarations. The storage structure will hold as many namespaces as the form designer needs to store. The collection holds the prefix and URI for each namespace.
3. The form designer may specify a data type of the value column, for example, character, date, or integer.
4. The form designer may define zero to many label columns by supplying header text and XPATH statements for each column. Optionally, the form designer may add an XML attribute for any label in case the label is defined in an attribute rather than element text. The header text is used at run-time to identify each returned column so that the attribute can be extracted from the XML element.
5. The form designer may set a context key that will apply to this instance of the form manager component 122. The form manager component 122 will use the context key at run-time to extract context settings from run-time options so that this instance can be configured with information such as the location of credentials for the web service 140 or installation-specific settings. By providing a context key specific to an instance, multiple instances can be used in the same prompting application. The form manager component 122 should supply any available run-time context.

Form Execution Phase

Once a form 154 has been designed, the application 120 and/or the form manager component 122 may store the form 154 for use by the application 120. When the application 120 is executing, that is operating in a run-time mode, the form manager component 122 may enter a form execution phase to generate the form 154 for rendering by an electronic display. A user may interact with the form 154 to cause the form information module 402 of the form manager component 122 to initiate retrieval operations for form information 144 from the web service 140. Run-time operations during the form execution phase may be described with reference to FIGS. 11-14.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 11 illustrates one embodiment of a logic flow 1100. The logic flow 1100 may be representative of some or all of the operations executed by one or more embodiments described herein. For instance, the logic flow 1100 may be representative of some or all of the operations executed by the dynamic form system 100 and/or the form manager component 122.

In the illustrated embodiment shown in FIG. 11, the logic flow 1100 may generate a form for a user interface of an application at block 1102. For instance, the form manager component 122 may generate a form 154 for a user interface view 152 generated by the user interface component 124 of the application 120.

The logic flow 1100 may generate a form information query for the form, the form information query comprising a data structure having static form configuration information, dynamic form configuration information, or a combination of static form configuration information and dynamic form configuration information, at block 1104. For instance, the form information module 402 of the form manager component 122 may generate one or both of form information queries 404, 704 for the form 154. The form information queries 404, 704 may each comprise a data structure having static form configuration information 204, dynamic form configuration information 604, or a combination of static form configuration information 204 and dynamic form configuration information 604.

The logic flow 1100 may send the form information query to a web service at block 1106. For instance, the form information module 402 may send one or both of the form information queries 404, 704 to the web service 140. The web service 140 may process the received form information queries 404, 704, retrieve one or more form value sets 508-$d$ of form information 144 from the form information source 142, and send the retrieved form value sets 508-$d$ to the logic device 110. It is worthy to note that a given form value set 508-$d$ may comprise zero or more members. It is also worthy to note that a form value set 508-$d$ may be sent in a number of different data formats, such as an XML document, for example. The embodiments are not limited in this context.

The logic flow 1100 may receive form information in response to the form information query from the web service at block 1108. For instance, the form manager component 122 may receive the form information 144 in response to the form information queries 404, 704 from the web service 140. The form manager component 122 may process the form information 144 to retrieve the form value sets 508-$d$ prior to presenting the form information 144. For instance, if the form value sets 508-$d$ are sent as part of an XML document, the form manager component 122 may parse the XML document using the static query parameters 406-$c$ and/or dynamic query parameters 706-$f$ to retrieve the form value sets 508-$d$.

The logic flow 1100 may present the form information in a field of the form on the user interface of the application at block 1110. For instance, the form manager component 122 may present the form information 144 in a field 304-$b$ of the form 154 on the user interface view 152 of the application 120. In one embodiment, the form manager 122 may present the form information 144 in the form 154 using the form viewer 150.

Figure 12:
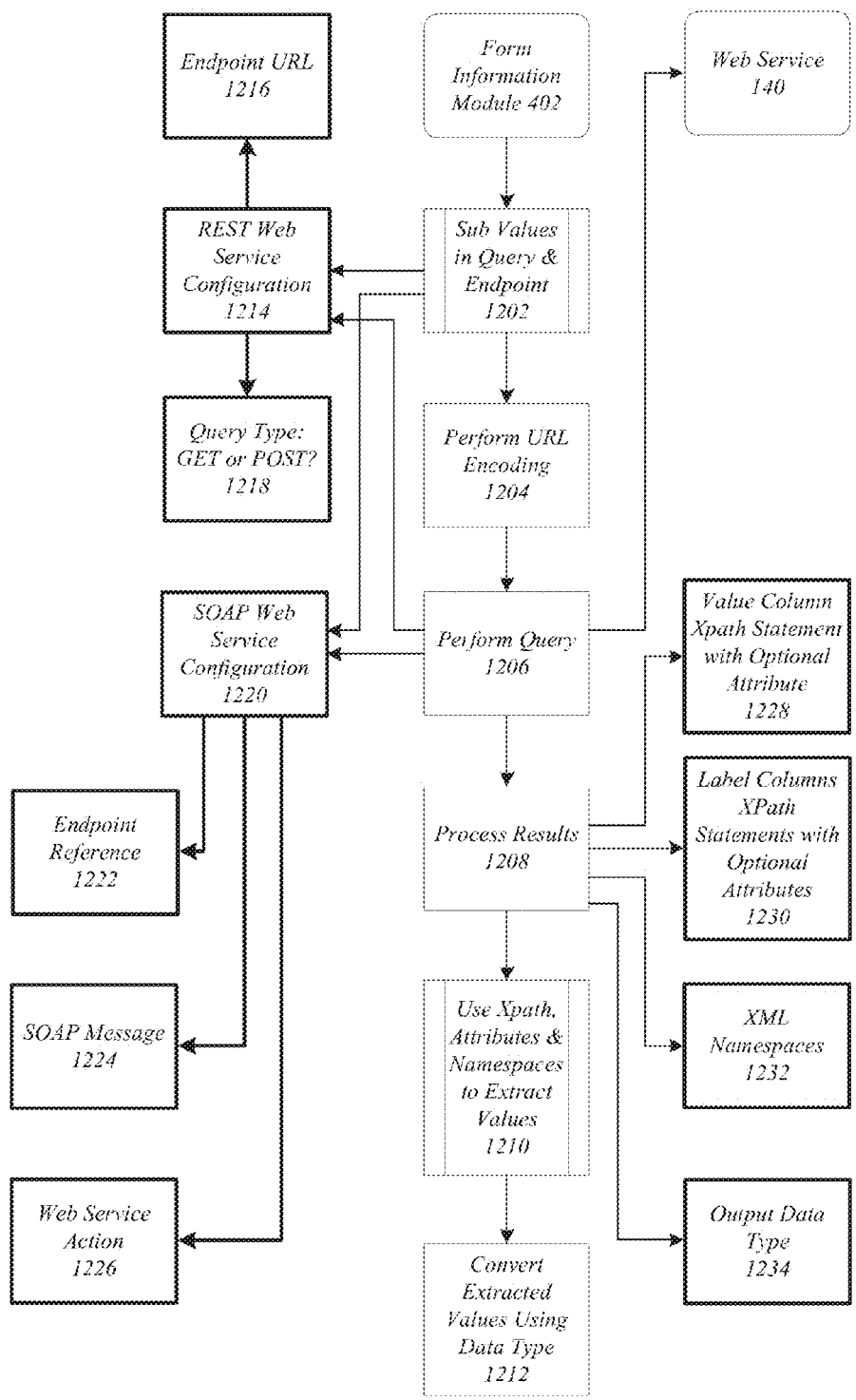
FIG. 12 illustrates an embodiment of a second logic flow.

FIG. 12 illustrates one embodiment of a logic flow 1200. The logic flow 1200 may be representative of some or all of the operations executed by one or more embodiments described herein. For instance, the logic flow 1200 may be representative of a specific implementation for the dynamic form system 100 and/or the form manager component 122. The form manager component 122 may receive configuration information in the form of static form configuration information 204 and/or dynamic form configuration information 604 as indicated by the bolded boxes.

The form information module 402 may optionally receive context options as dynamic form configuration information 604. The context options are settings that are independent of those needed to define the web service calls 410, 710. Examples include a URL and port number of a proxy server needed for passage through a firewall. Another example would be security credentials since these tend to change over time and should not be stored as static form configuration information 204. The keys in the map of options should start with a prefix specified as static form configuration information 204 during the design phase for a form 154. The keys should end with constants published in an API of the form information module 402. The form information module 402 will look for keys in the options map and set all available options on itself.

In the illustrated embodiment shown in the logic flow 1200, the form information module 402 may generate a form information query 404, 704 which may optionally include receiving query substitution values selected by a user as stored by the dynamic query parameters 706-$f$ at block 1202. In the case of a REST-style web service, this may include receiving an endpoint URL 1216, a REST web service configuration 1214, and a query type 1218 (e.g., HTTP GET or HTTP POST). In the case of a SOAP-style web service, this may include receiving a SOAP web service configuration 1220, an endpoint reference 1222, a SOAP message 1224, and a web service action 1226. The form information module 402 will then insert any substitution values into a form information query 704, using a templating algorithm, before it is submitted to the web service 140. Referring to a previous example, the form information module 402 may receive "Duke Energy" as the name of the power company whose carbon emissions a user wants to retrieve. Then the form information module 402 will insert "Duke%20Energy" into a form information query 704 as previously described.

The form information module 402 performs URL encoding at block 1204, and executes the form information query 704 at block 1206. The form information module 402 makes the framework call to the web service 140 which returns an XML result with the form information 144. The form information module 402 may use any third-party framework that can contact the web service 140 and apply XPATH statements to the returned XML. The form information module 402 initializes the third-party framework by applying static query parameters 406-c and dynamic query parameters 706-f from a storage object to the framework. Specifically, the form information module 402 applies any run-time options passed in via keys on the context. It also applies the REST-style or SOAP-style query to the framework.

The form information module 402 receives the XML result with the form information 144, and processes the results at block 1208. In order to process the XML results, the form information module 402 retrieves static query parameters 406-c and/or dynamic query parameters 706-f representing value column XPATH statements with optional attributes 1228, label columns XPATH statements and optional attributes 1230, XML namespaces 1232, and output data type 1234.

The form information module 402 uses information 1228, 1230 and 1232 to extract form values 802-g, 902-h from the XML result at block 1210. The form information module 402 applies the XPATH statements with optional attributes 1228 for the value column and the XPATH statements with optional attributes 1230 for all label columns to the XML result along with all of the XML namespace definitions 1232. If any value or label column is associated with an XML attribute, that attribute is inserted into the XPATH statement before the statement is applied to the XML result.

The form information module 402 then converts the extracted form values 802-g, 902-h using the output data type 1234 at block 1212. The character data obtained from the value and label XML results are put into lists for each column. The lists are set on a data structure representing a column of values. Header text is also taken from a storage structure for the form information module 402, and put on each column data structure. The data type of the value column is taken from the storage structure and put on the column data structure for the value column.

The form information module 402 passes the collection of all column data structures to the form manager component 122 as the return value of an API method so that the values and labels can be displayed to the user on the form 154. The user can then select from among the form values 802-g, 902-h shown in order to answer the particular prompt associated with the form 154.

Figure 13:
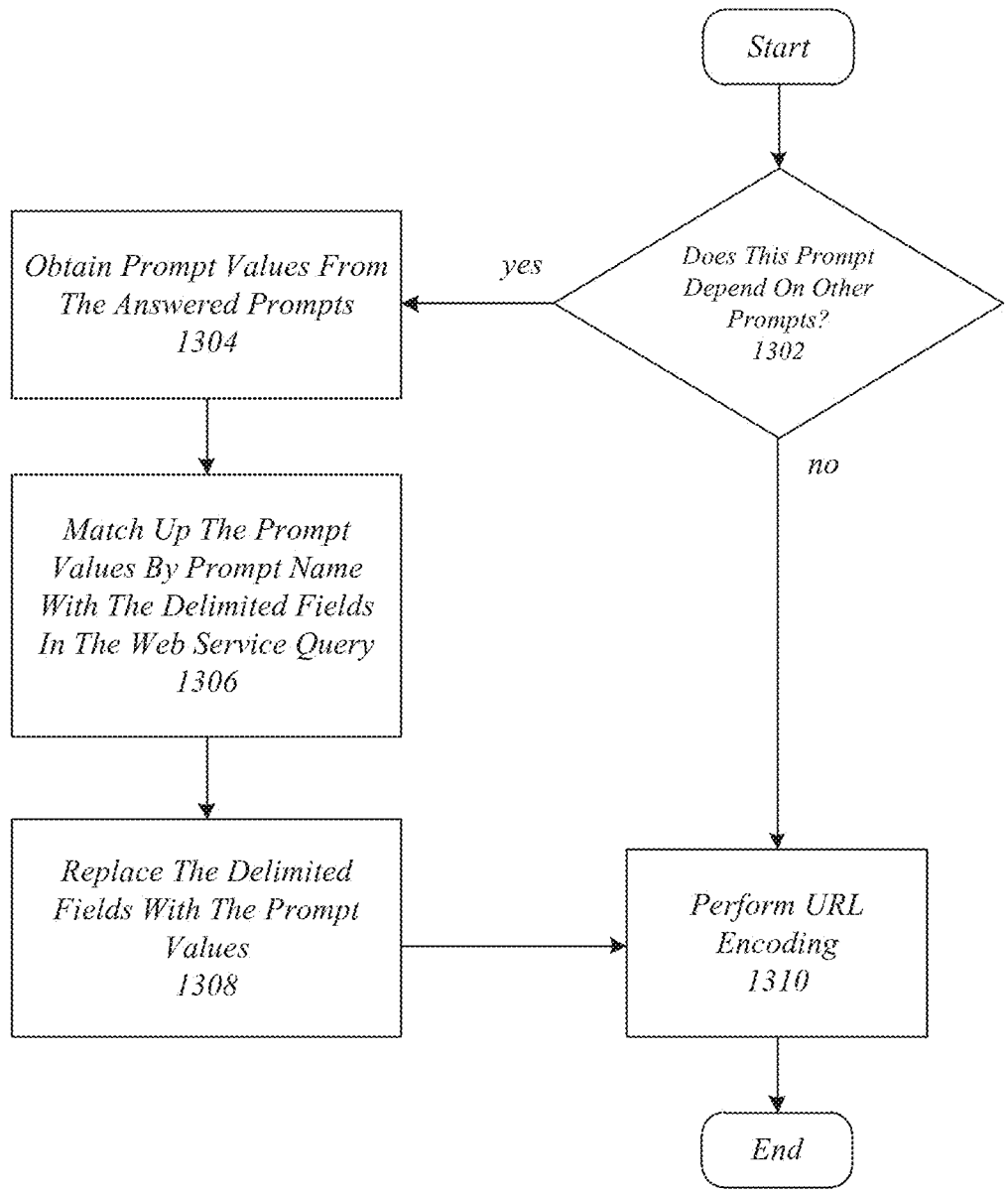
FIG. 13 illustrates an embodiment of a third logic flow.

FIG. 13 illustrates one embodiment of a logic flow 1300. The logic flow 1300 may be representative of some or all of the operations executed by one or more embodiments described herein. For instance, the logic flow 1300 may be representative of a specific implementation for the dynamic form system 100 and/or the form manager component 122 to execute substitution operations of block 1202 as described with reference to FIG. 12.

In the illustrated embodiment shown in FIG. 13, the logic flow 1300 may determine whether a prompt depends on other prompts at block 1302. For instance, the form information module 402 may determine whether the form information module 402 should generate a form information query 404 with static query parameters 406-c, or a form information query 704 with dynamic query parameters 706-f or a combination of static query parameters 406-c and dynamic query parameters 706-f.

If the form information module 402 determines to generate a form information query 404, without any substitution strings, the form information module 402 moves on to perform URL encoding at block 1310.

If the form information module 402 determines to generate a form information query 704, with substitution strings, the form information module 402 obtains prompt values from the answered prompts at block 1304. For instance, the form information module 402 may obtain prompt values as stored by one or more form values 708-4 of the dynamic query parameters 706-f. The form information module 402 may match up the prompt values by prompt name with the delimited fields in the web service call 710 at block 1306. The form information module 402 may then replace the delimited fields with the answered prompts at block 1308. The form information module 402 then performs URL encoding at block 1310.

Figure 14:
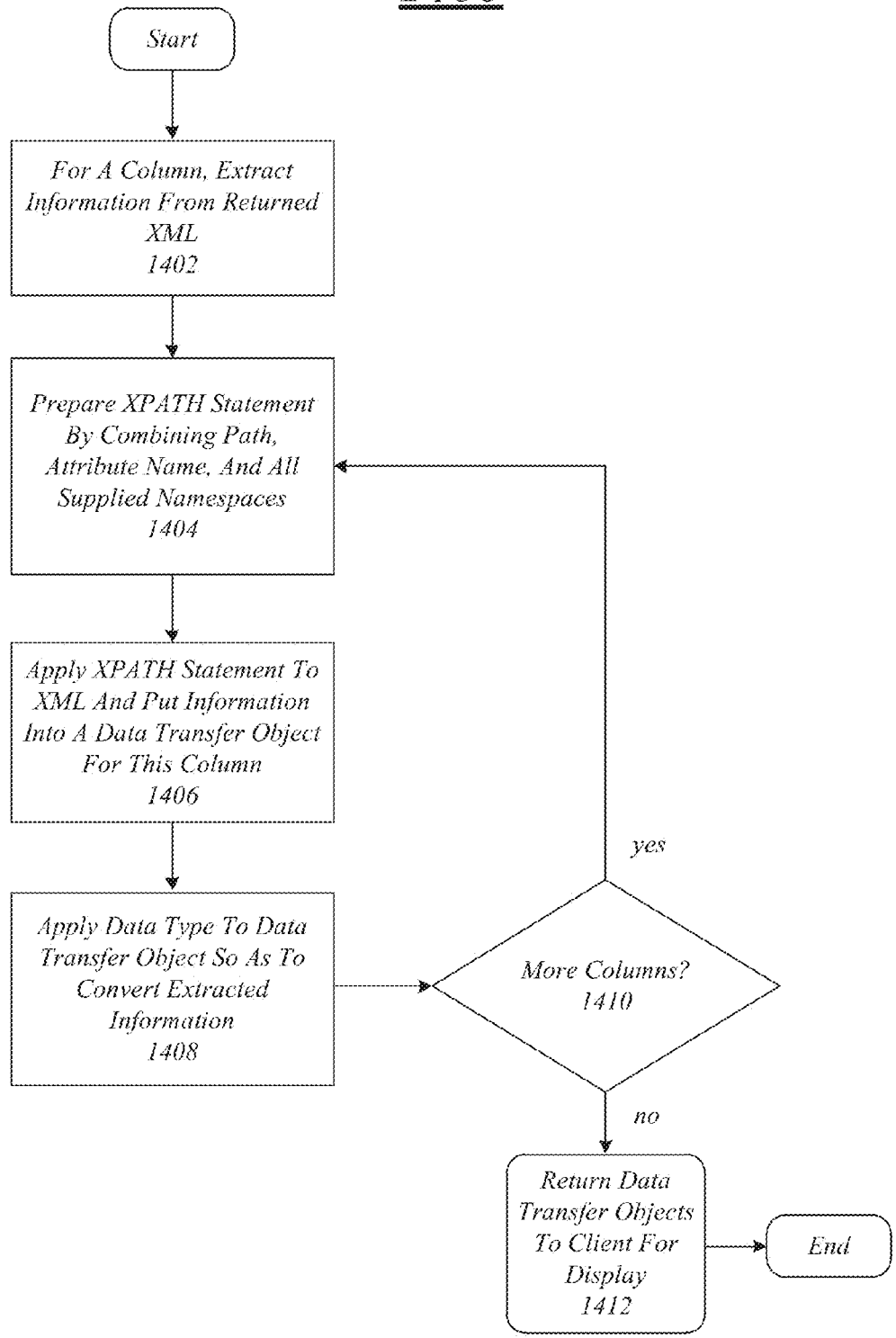
FIG. 14 illustrates an embodiment of a fourth logic flow.

FIG. 14 illustrates one embodiment of a logic flow 1400. The logic flow 1400 may be representative of some or all of the operations executed by one or more embodiments described herein. For instance, the logic flow 1400 may be representative of a specific implementation for the dynamic form system 100 and/or the form manager component 122 to execute extraction operations of block 1210 as described with reference to FIG. 12.

In this illustrated embodiment shown in FIG. 14, the form information module 402 may extract from information 144 from a returned XML result for a given column at block 1402. The form information module 402 may prepare an XPATH statement by combining a path, an attribute name and all supplied XML namespaces at block 1404. The form information module 402 may apply the XPATH statement to the XML result and put form information 144 into a data transfer object for the column at block 1406. The form information module 402 may apply a data type to the data transfer object to convert extracted form information 144 at block 1408. The form information module 402 may determine whether more columns remain to be processed at diamond 1410. If yes, then the operations of blocks 1404, 1406 and 1408 are repeated. If no, then the form information module 402 returns the data transfer objects to the form manager component 122 for presentation on an electronic display.

Figure 15:
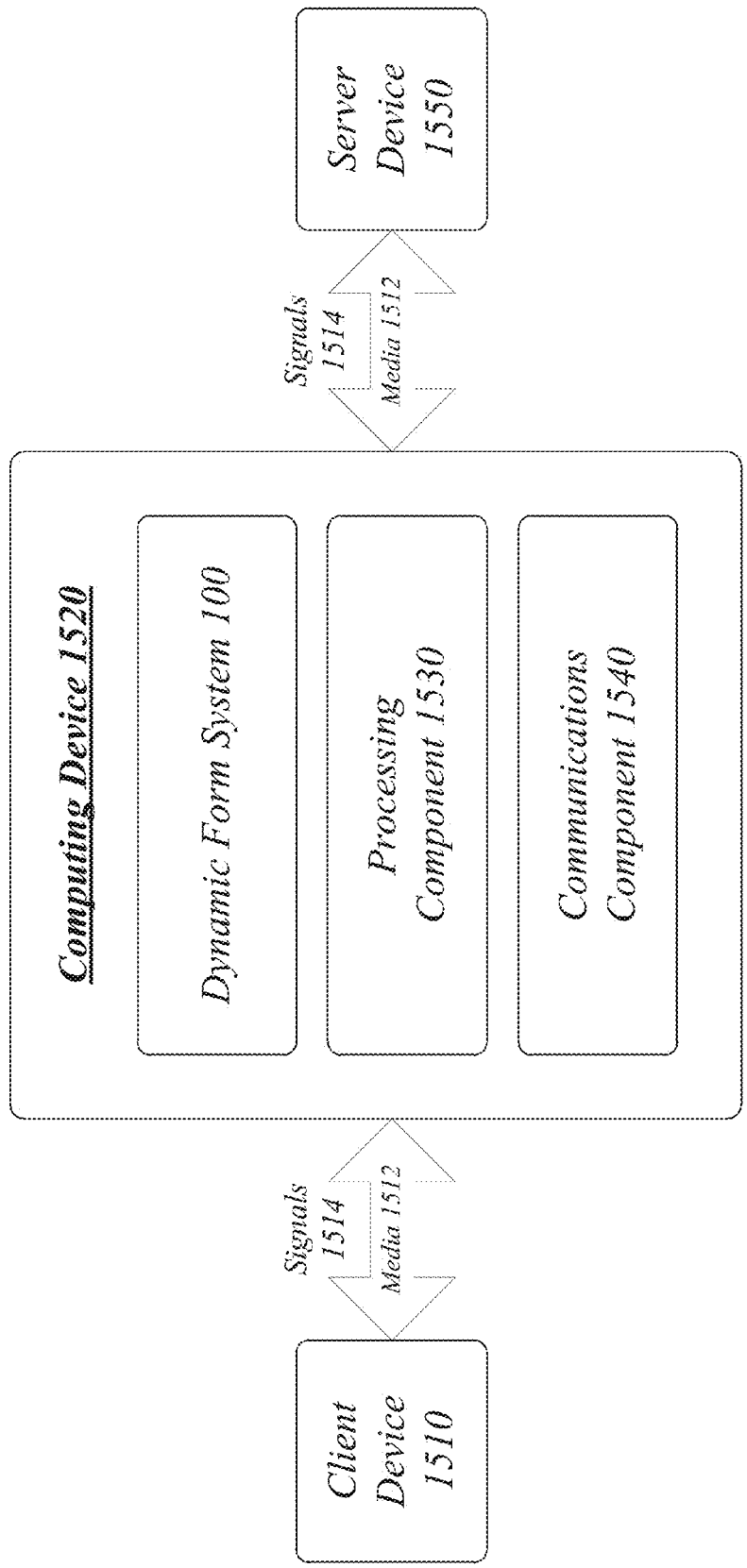
FIG. 15 illustrates an embodiment of a centralized system implementing a dynamic form system.

FIG. 15 illustrates a block diagram of a centralized system 1500. The centralized system 1500 may implement some or all of the structure and/or operations for the dynamic form system 100 in a single computing entity, such as entirely within a single computing device 1520.

The computing device 1520 may execute processing operations or logic for the system 100 using a processing component 1530. The processing component 1530 may comprise various hardware elements, software elements, or a combination of both. Examples of hardware elements may include devices, logic devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 1520 may execute communications operations or logic for the dynamic form system 100 using communications component 1540. The communications component 1540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1520 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 1520.

The computing device 1520 may communicate with other devices 1510, 1550 over a communications media 1512 using communications signals 1514 via the communications component 1540. For instance, assume the logic device 110, the application 120, the form manager component 122, and the user interface component 124 are implemented by a server as part of a cloud computing framework. For instance, the application 120 may comprise a SAS software application such as BI software or statistical analysis software implemented as a hosted application by a server array represented by the computing device 1520. The client device 1510 may comprise a smart phone or a tablet computer accessing the computer device 1520 to execute and manipulate the application 120 and the form manager component 122, including generating and populating a form 154. The server device 1550 may host a web service 140 for storing form information 144 for the form 154. Form information 144 may be communicated between the devices 1510, 1520, 1550 as communications signals 1514 via communications media 1512.

Figure 16:
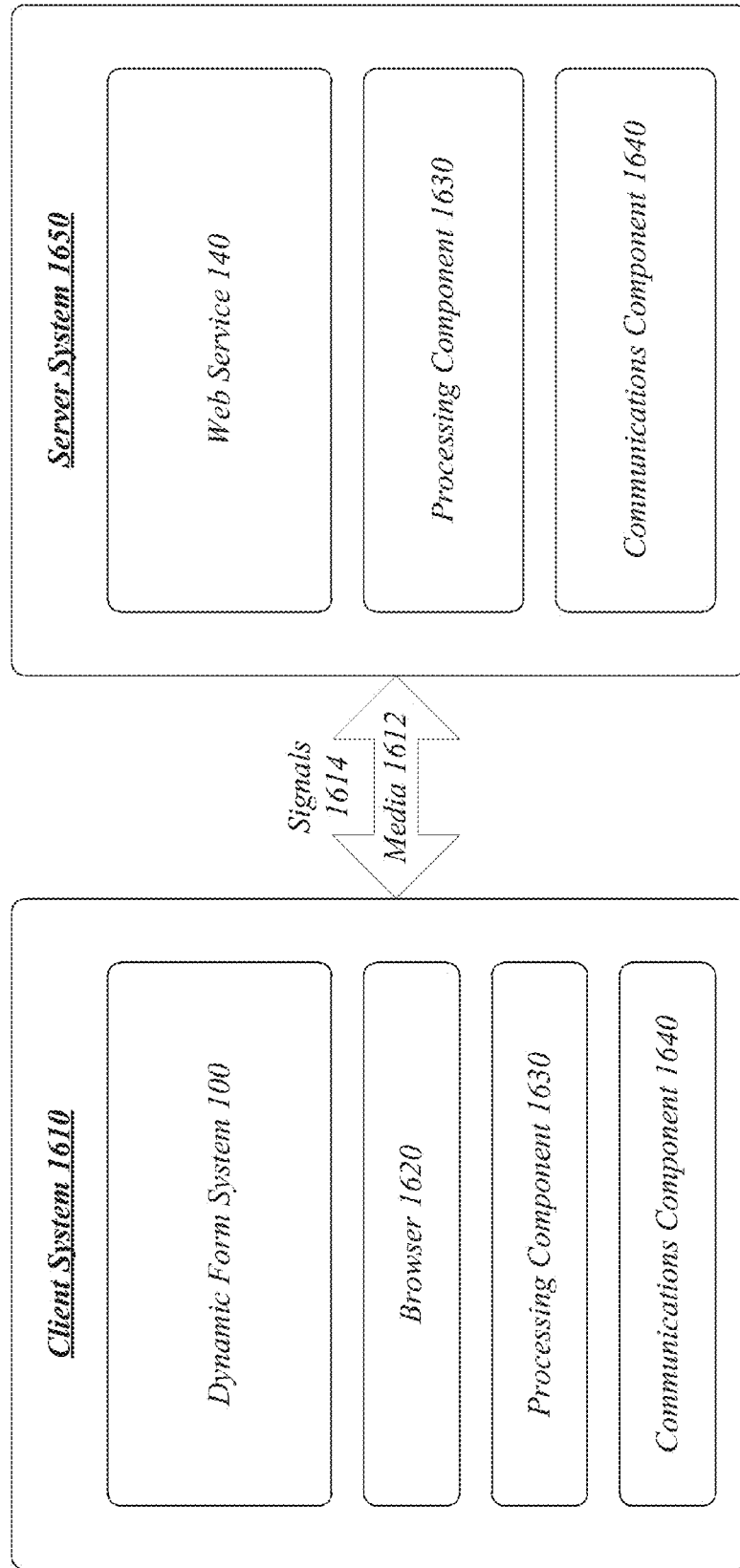
FIG. 16 illustrates an embodiment of a distributed system implementing a dynamic form system.

FIG. 16 illustrates a block diagram of a distributed system 1600. The distributed system 1600 may distribute portions of the structure and/or operations for the dynamic form system 100 across multiple computing entities. Examples of distributed system 1600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 1610 and the server system 1650 may process information using the processing components 1630, which are similar to the processing component 1530 described with reference to FIG. 15. The client system 1610 and the server system 1650 may communicate with each other over a communications media 1612 using communications signals 1614 via communications components 1640, which are similar to the communications component 1540 described with reference to FIG. 15.

In one embodiment, for example, the distributed system 1600 may be implemented as a client-server system. A client system 1610 may implement the dynamic form system 100, a browser 1620, a processing component 1630, and a communications component 1640. A server system 1650 may implement the web service 140, a processing component 1630, and a communications component 1640. In various embodiments, the client system 1610 may comprise or employ one or more client computing devices and/or client programs that operate to perform various methodologies in accordance with the described embodiments. For instance, assume the logic device 110, the application 120, the form manager component 122, and the user interface component 124 are all implemented by a client system 1610, such as a smart phone, hand held computer, or tablet computer. In this case, the application 120 may comprise a SAS software application such as BI software or statistical analysis software implemented as a client application on the client system 1610. The client system 1610 may execute and manipulate the application 120 and the form manager component 122, including generating a form 154. The form manager component 120 may populate the form 154 with form information 144 stored by the server system 1650.

In various embodiments, the server system 1650 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 1650 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs for managing incoming and outgoing messages, messaging server programs for providing unified messaging (UM) for e-mail, voicemail, VoIP, instant messaging (IM), group IM, enhanced presence, and audio-video conferencing, and/or other types of programs, applications, or services in accordance with the described embodiments. In one embodiment, the server system 1650 may implement a web services framework for hosting a web service 140. The web service 140 may store form information 144 for the form 154 managed by the client system 1610. Form information 144 may be communicated between the client system 1610 and the server system 1650 as communications signals 1614 via communications media 1612.

Figure 17:
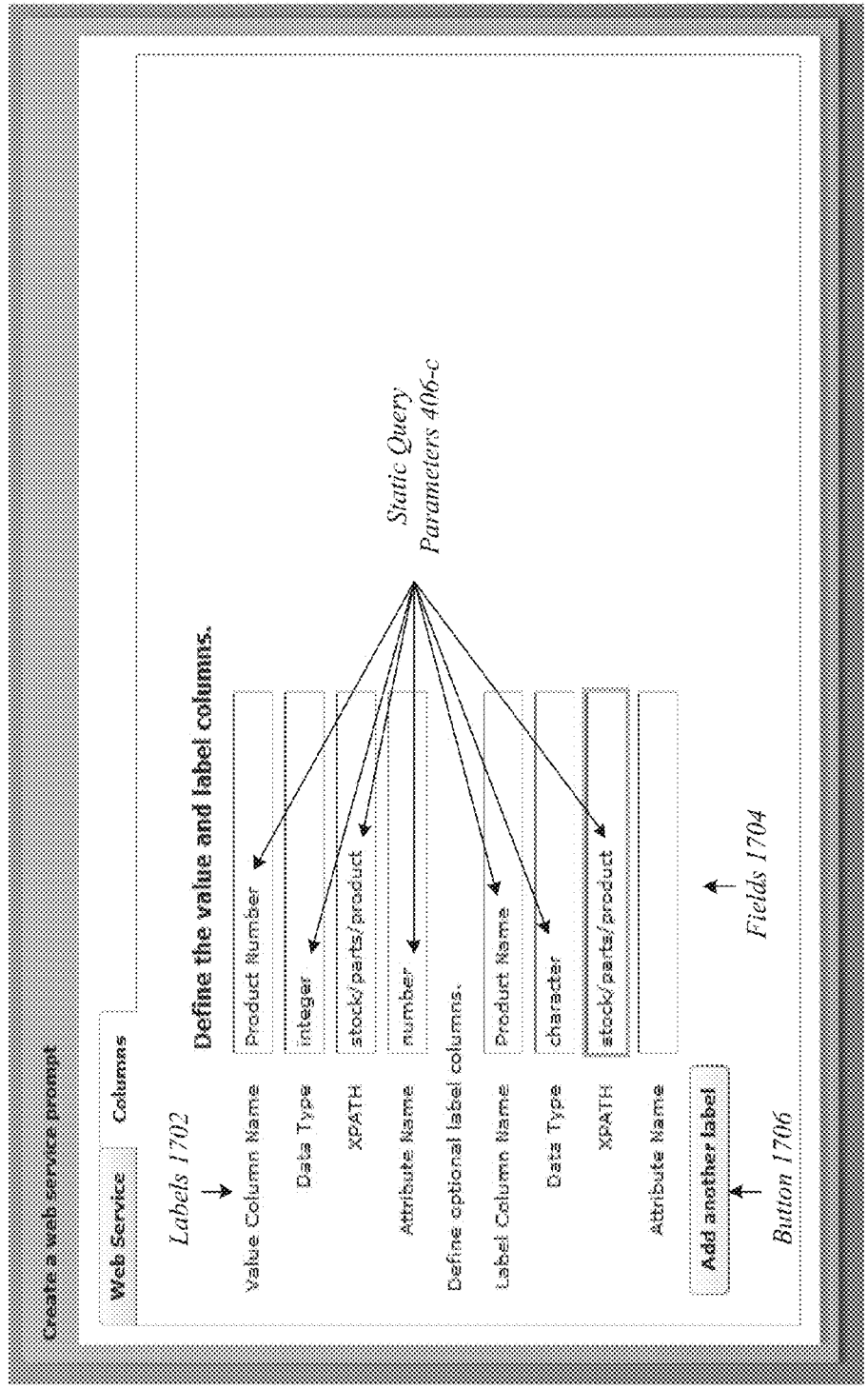
FIG. 17 illustrates an embodiment of a first graphical user interface (GUI) view for a dynamic form system.

FIG. 17 illustrates an embodiment of a GUI view 1700 for a dynamic form system 100. The GUI view 1700 illustrates a set of labels 1702 and fields 1704 for setting a number of static query parameters 406-$c$ related to columns for a form 154. As shown in the GUI view 1700, additional labels 1702 and corresponding fields 1704 may be added as desired for a given implementation via button 1706.

Figure 18:
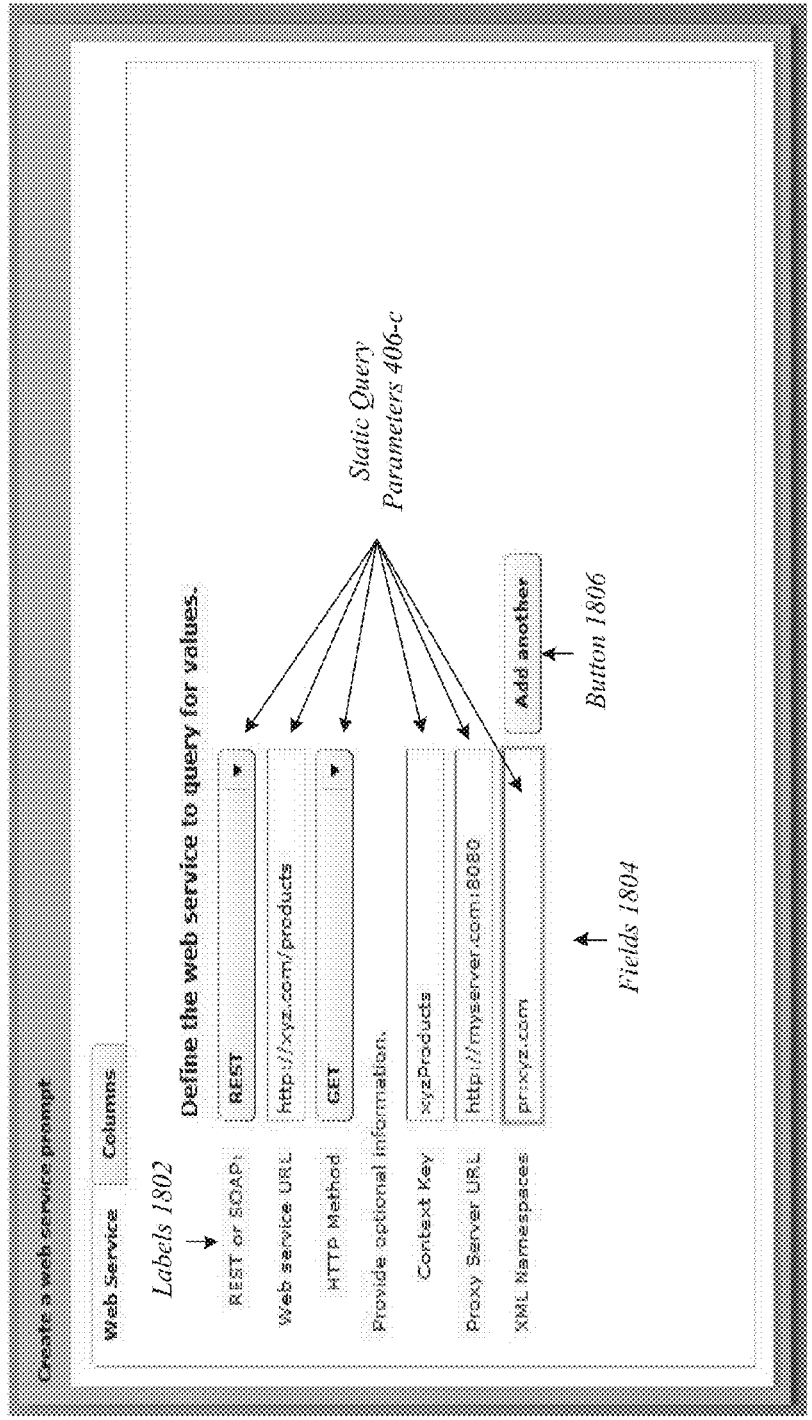
FIG. 18 illustrates an embodiment of a second GUI view for a dynamic form system.

FIG. 18 illustrates an embodiment of a GUI view 1800 for a dynamic form system 100. The GUI view 1800 illustrates a set of labels 1802 and fields 1804 for setting a number of static query parameters 406-$c$ related to a web service 140 for a form 154. As shown in the GUI view 1800, additional labels 1802 and corresponding fields 1804 may be added as desired for a given implementation via button 1806.

FIG. 19 illustrates an embodiment of a table 1900 for a dynamic form system 100. The table 1900 illustrates an example of form information 144 stored by a form information source of a web service 140. The table 1900 comprises a set of values 1902 and labels 1904. The labels 1904 represent names of various power plants producing carbon dioxide. The values 1902 represent carbon dioxide levels associated with each power plant. The values 1902 and the labels 1904 are related to a form information query 404, 704 having a static query parameter 406-c or a dynamic query parameter 706-f set to "Duke Energy."

Figure 20:
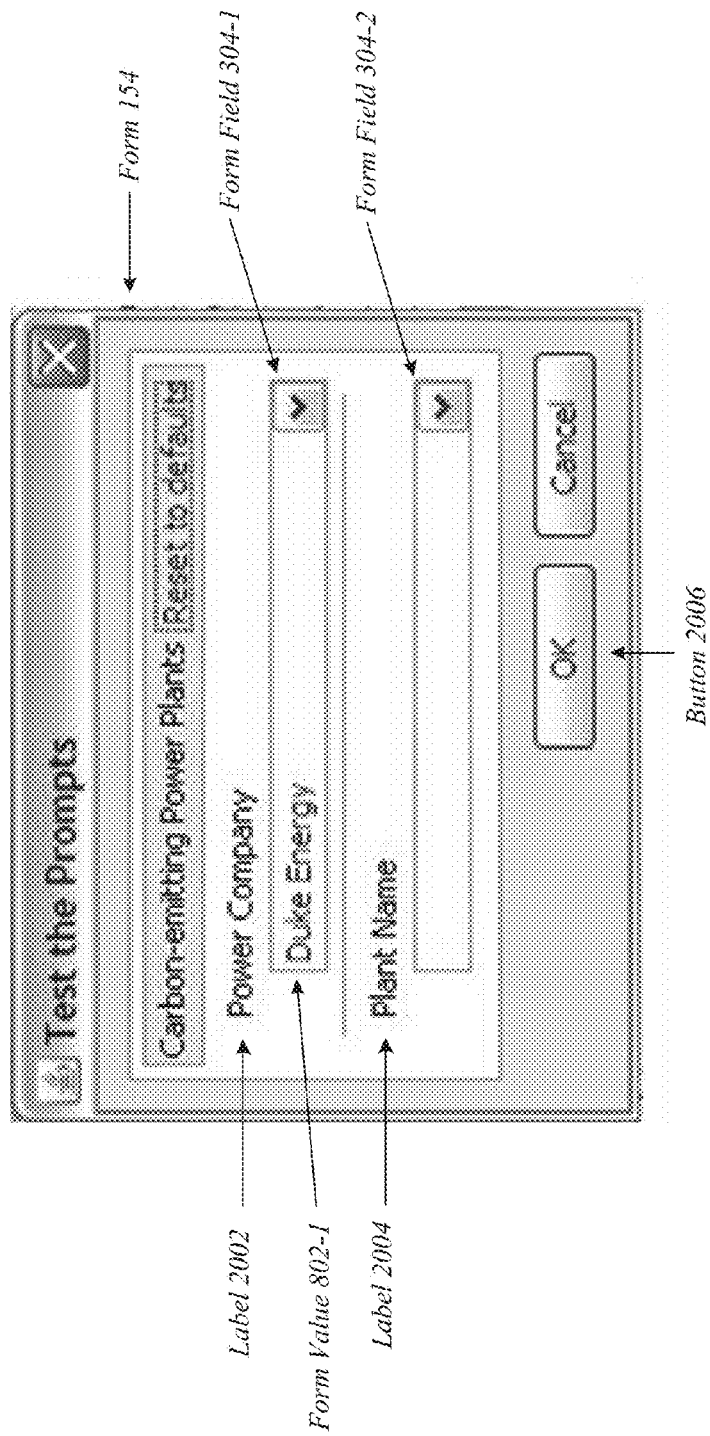
FIG. 20 illustrates an embodiment of a third GUI view for a dynamic form system.

FIG. 20 illustrates an embodiment of a GUI view 2000 for a dynamic form system 100. The GUI view 2000 illustrates an exemplary implementation for a form 154 before retrieving form information 144 from a web service 140. The form 154 may use form information 144 stored, for example, in table 1900 by the web service 140.

More particularly, the GUI view 2000 illustrates an example of a simple cascading prompt using two form fields 304-1, 304-2 as prompts. A label 2002 for "Power Company" prompts a form information query 404 to the web service 140 for all US power companies as form values 802-g. The returned values populate the combo box of available values for the first prompt labeled "Power Company." The GUI view 2000 shows that the user selected "Duke Energy" as a form value 802-1 from among form values 802-g as described with reference to FIG. 8. The form 154 may further comprise a label 2004 of "Plant Name" and an empty form field 304-2. After a user selects the form field 802-1, the form manager component 122 may generate a form information query 704 specifying "Duke Energy" as part of the query string to retrieve a set of power plants associated with the name "Duke Energy."

Figure 21:
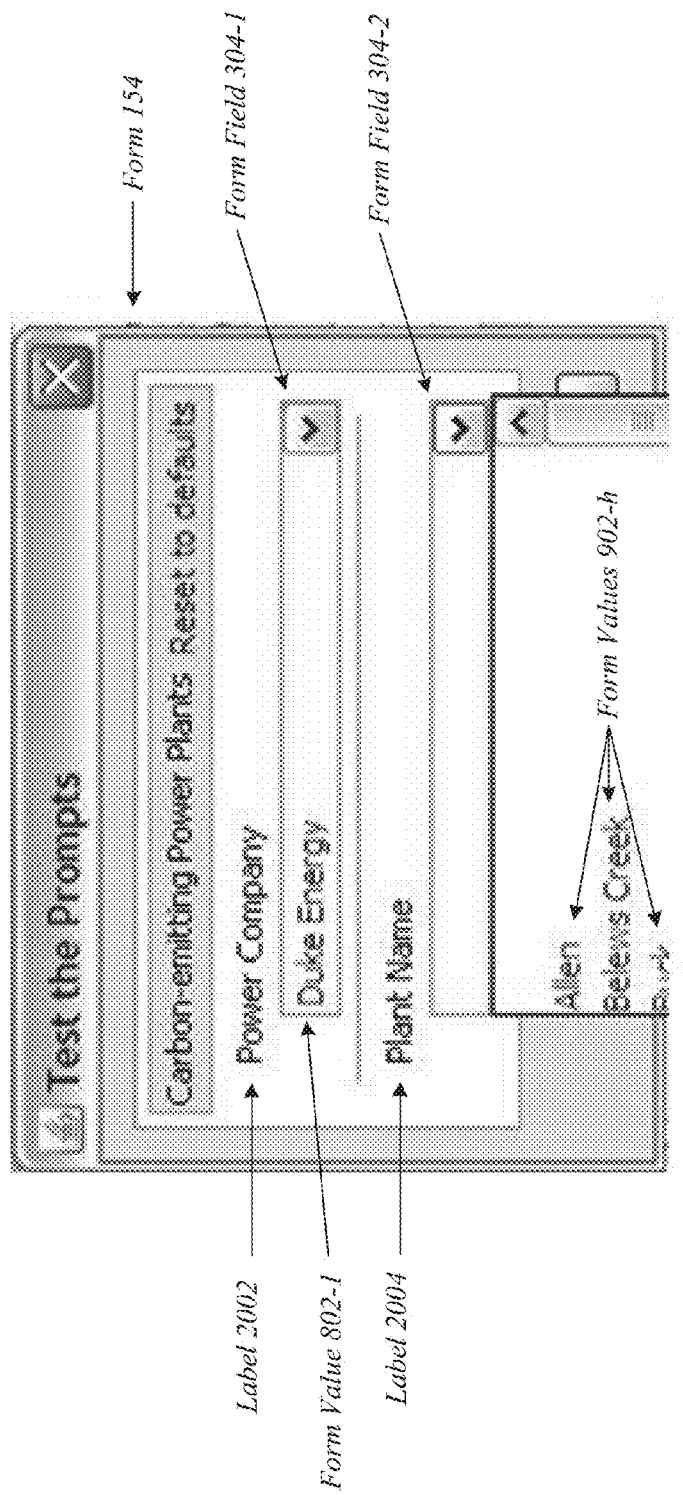
FIG. 21 illustrates an embodiment of a fourth GUI view for a dynamic form system.

FIG. 21 illustrates an embodiment of a GUI view 2100 for a dynamic form system 100. The GUI view 2100 illustrates an exemplary implementation for a form 154 after retrieving form information 144 from a web service 140. After the user selects a company name of "Duke Energy" for the form field 304-1, the selected name is inserted into a form information query 704 to retrieve power plant names. The prompt designer specified that plant name would be the label 2004 to display in a drop-down list in the combo box of the second prompt as form values 902-h. The tons of carbon as CO2 are the values, but are not displayed in the GUI view 2100. After the user selects a power plant from the form values 902-h, and clicks the OK button 2006 (shown in FIG. 20), the value of tons for that power plant are passed into the application 120 displaying the form 154.

Figure 22:
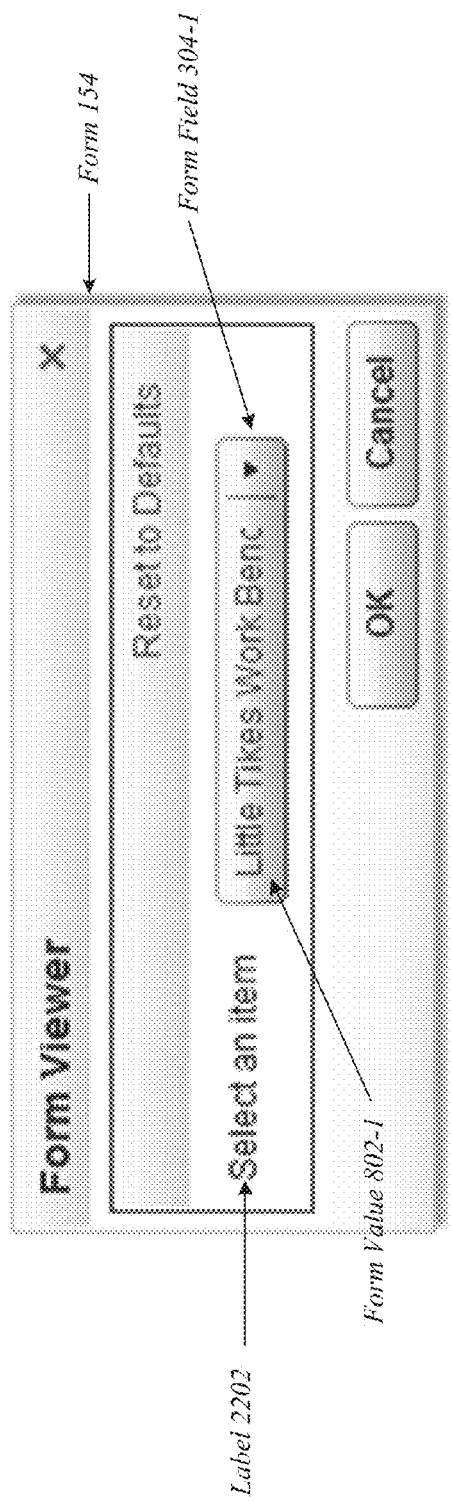
FIG. 22 illustrates an embodiment of a fifth GUI view for a dynamic form system.

FIG. 22 illustrates an embodiment of a GUI view 2200 for a dynamic form system 100. The GUI view 2200 illustrates an example of a form viewer 150 presenting a form 154 with a single column query to a web service 140 that returns the items listed for sale on an electronic "bulletin board." The combo box has a label 2202 of "Select an item" as a prompt, and a single form field 304-1 having a drop-down list containing a form value 802-1 of "Little Tikes Work Bench" from among multiple form values 802-g comprising all of the bulletin board items returned by the form manager component 122.

Figure 23:
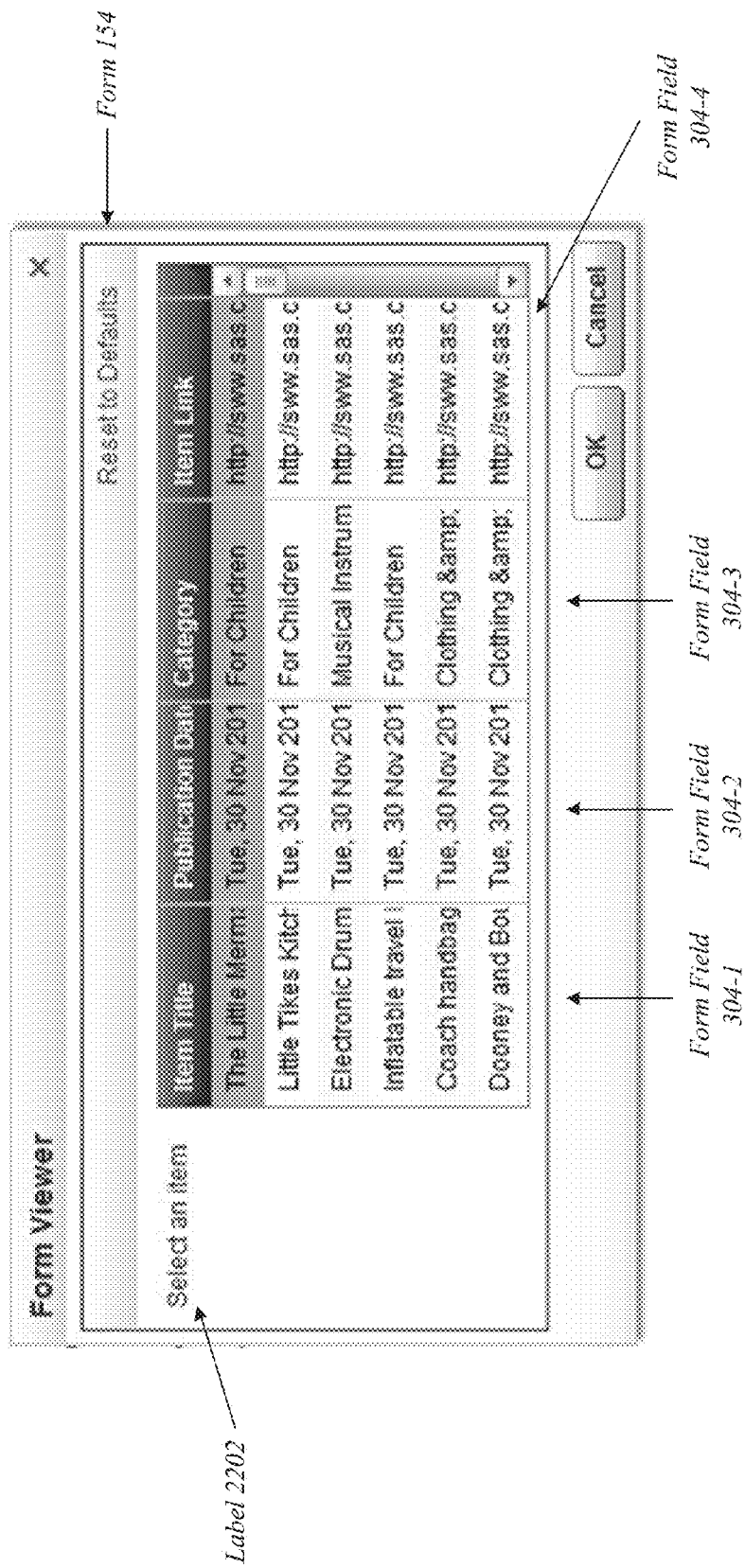
FIG. 23 illustrates an embodiment of a sixth GUI view for a dynamic form system.

FIG. 23 illustrates an embodiment of a GUI view 2300 for a dynamic form system 100. The GUI view 2300 illustrates an example of a multiple column query to the same web service 140 described in FIG. 22. In this view, the form information query 404, 704 sent to the web service 140 returned four columns of form information 144 for form fields 304-1, 304-2, 304-3 and 304-4 representing a respective "Item Title" representing an item name, a "Publication Date" representing a date the item name was published on the bulletin board, a "Category" representing a category for the item name, and an "Item Link" representing a URL link to an item description for the item name.

Figure 24:
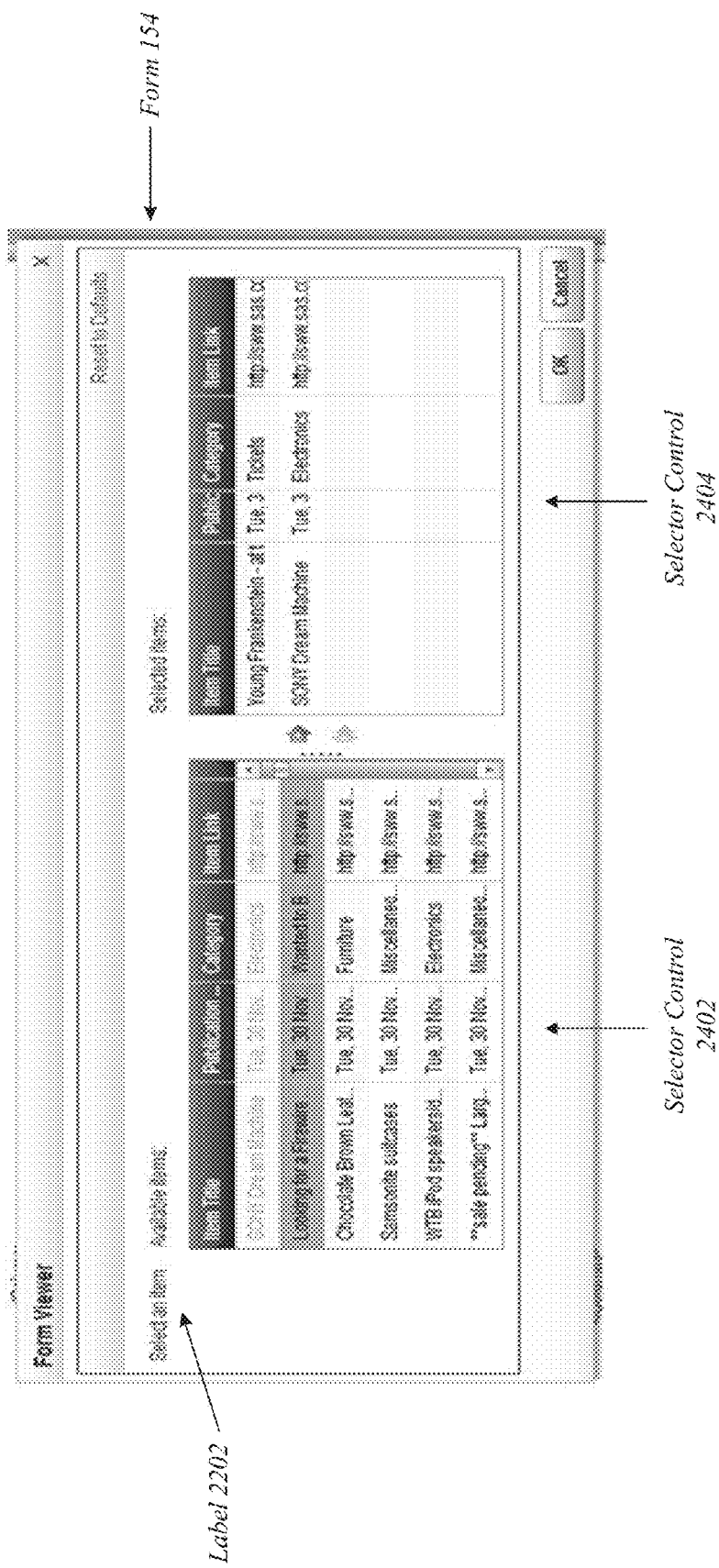
FIG. 24 illustrates an embodiment of a seventh GUI view for a dynamic form system.

FIG. 24 illustrates an embodiment of a GUI view 2400 for a dynamic form system 100. The GUI view 2400 illustrates an example of a multi-column query similar to the query described in FIG. 23 as displayed in a form viewer 150 that allows the user to select more than one item. The dual selector controls 2402, 2404 allows a user to move multiple items from the "available" side of selector control 2402 to the "selected" side of the selector control 2404.

Figure 25:
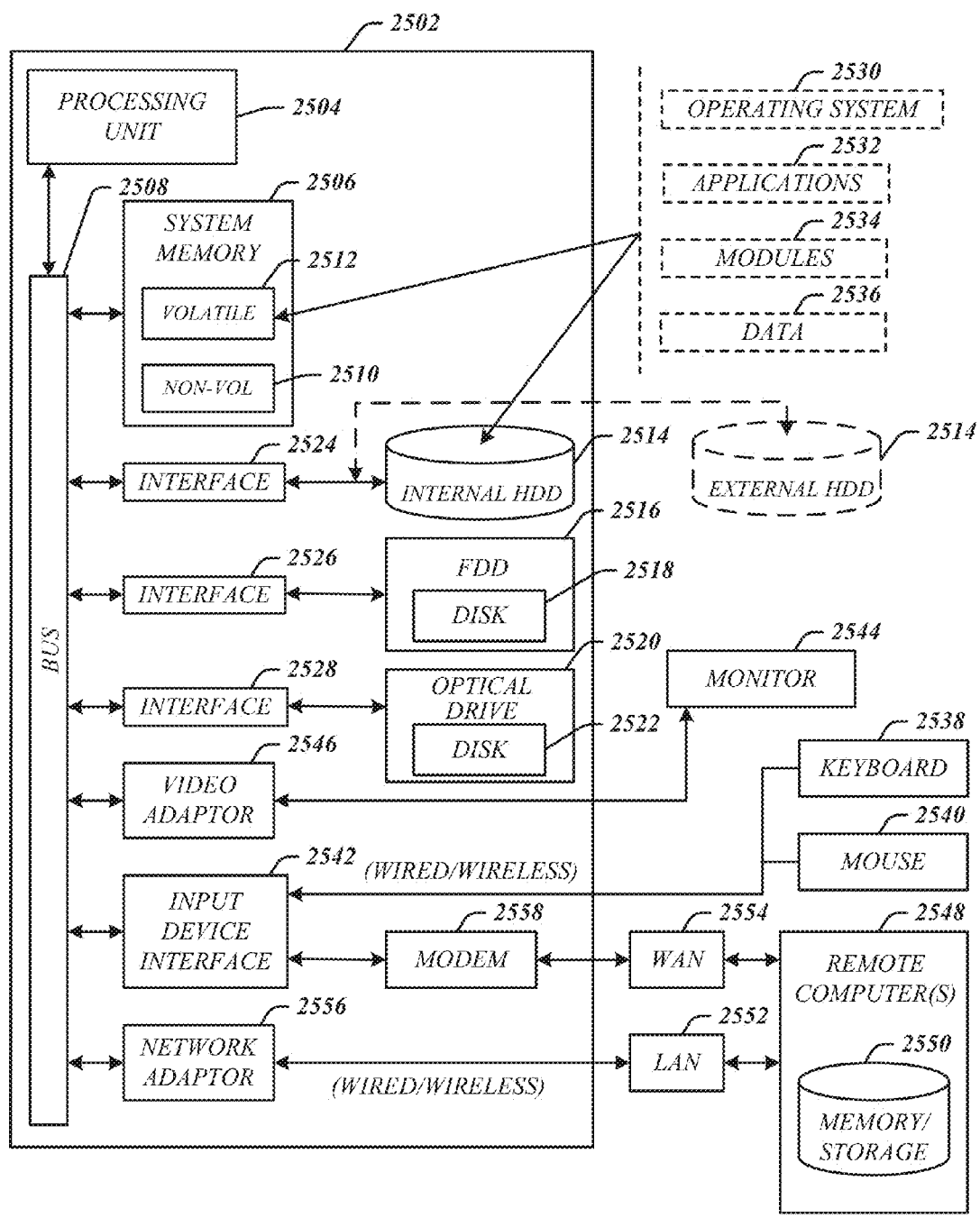
FIG. 25 illustrates an embodiment of a computing architecture.

FIG. 25 illustrates an embodiment of an exemplary computing architecture 2500 suitable for implementing various embodiments as previously described, such as the dynamic form system 100, for example. The computing architecture 2500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 2500.

As shown in FIG. 25, the computing architecture 2500 comprises a processing unit 2504, a system memory 2506 and a system bus 2508. The processing unit 2504 can be any of various commercially available processors. Dual microprocessors and other multi-processor architectures may also be employed as the processing unit 2504. The system bus 2508 provides an interface for system components including, but not limited to, the system memory 2506 to the processing unit 2504. The system bus 2508 can be any of several types of bus structure that may further interconnect to a memory bus (with or without a memory controller), a peripheral bus, and a local bus using any of a variety of commercially available bus architectures.

The system memory 2506 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 25, the system memory 2506 can include non-volatile memory 2510 and/or volatile memory 2512. A basic input/output system (BIOS) can be stored in the non-volatile memory 2510.

The computer 2502 may include various types of computer-readable storage media, including an internal hard disk drive (HDD) 2514, a magnetic floppy disk drive (FDD) 2516 to read from or write to a removable magnetic disk 2518, and an optical disk drive 2520 to read from or write to a removable optical disk 2522 (e.g., a CD-ROM or DVD). The HDD 2514, FDD 2516 and optical disk drive 2520 can be connected to the system bus 2508 by a HDD interface 2524, an FDD interface 2526 and an optical drive interface 2528, respectively. The HDD interface 2524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2510, 2512, including an operating system 2530, one or more application programs 2532, other program modules 2534, and program data 2536. The one or more application programs 2532, other program modules 2534, and program data 2536 can include, for example, the dynamic form system 100, the IPC component 140, the remote event bridge 130, and other software elements described with the embodiments.

A user can enter commands and information into the computer 2502 through one or more wire/wireless input devices, for example, a keyboard 2538 and a pointing device, such as a mouse 2540. Other input devices may include a microphone, an infra-red (IR) remote control, a joystick, a game pad, a stylus pen, touch screen, or the like. These and other input devices are often connected to the processing unit 2504 through an input device interface 2542 that is coupled to the system bus 2508, but can be connected by other interfaces such as a parallel port, IEEE 1394 serial port, a game port, a USB port, an IR interface, and so forth.

A monitor 2544 or other type of display device is also connected to the system bus 2508 via an interface, such as a video adaptor 2546. In addition to the monitor 2544, a computer typically includes other peripheral output devices, such as speakers, printers, and so forth.

The computer 2502 may operate in a networked environment using logical connections via wire and/or wireless communications to one or more remote computers, such as a remote computer 2548. The remote computer 2548 can be a workstation, a server computer, a router, a personal computer, portable computer, microprocessor-based entertainment appliance, a peer device or other common network node, and typically includes many or all of the elements described relative to the computer 2502, although, for purposes of brevity, only a memory/storage device 2550 is illustrated. The logical connections depicted include wire/wireless connectivity to a local area network (LAN) 2552 and/or larger networks, for example, a wide area network (WAN) 2554. Such LAN and WAN networking environments are commonplace in offices and companies, and facilitate enterprise-wide computer networks, such as intranets, all of which may connect to a global communications network, for example, the Internet.

When used in a LAN networking environment, the computer 2502 is connected to the LAN 2552 through a wire and/or wireless communication network interface or adaptor 2556. The adaptor 2556 can facilitate wire and/or wireless communications to the LAN 2552, which may also include a wireless access point disposed thereon for communicating with the wireless functionality of the adaptor 2556.

When used in a WAN networking environment, the computer 2502 can include a modem 2558, or is connected to a communications server on the WAN 2554, or has other means for establishing communications over the WAN 2554, such as by way of the Internet. The modem 2558, which can be internal or external and a wire and/or wireless device, connects to the system bus 2508 via the input device interface 2542. In a networked environment, program modules depicted relative to the computer 2502, or portions thereof, can be stored in the remote memory/storage device 2550. It will be appreciated that the network connections shown are exemplary and other means of establishing a communications link between the computers can be used.

The computer 2502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 26:
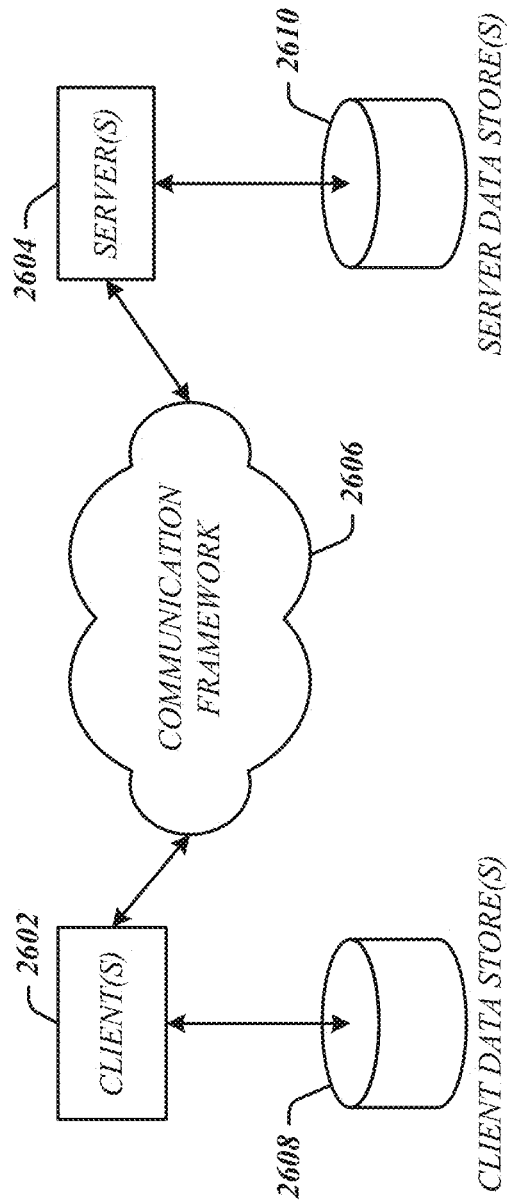
FIG. 26 illustrates an embodiment of a communications architecture.

FIG. 26 illustrates a block diagram of an exemplary communications architecture 2600 suitable for implementing various embodiments as previously described, such as the dynamic form system 100, particularly the network 130, for example. The communications architecture 2600 includes various common communications elements, such as a transmitter, receiver, transceiver, radio, network interface, baseband processor, antenna, amplifiers, filters, and so forth. The embodiments, however, are not limited to implementation by the communications architecture 2600.

As shown in FIG. 26, the communications architecture 2600 comprises includes one or more clients 2602 and servers 2604. The clients 2602 may implement the client systems 310, 400. The servers 2604 may implement the server system 330. The clients 2602 and the servers 2604 are operatively connected to one or more respective client data stores 2608 and server data stores 2610 that can be employed to store information local to the respective clients 2602 and servers 2604, such as cookies and/or associated contextual information.

The clients 2602 and the servers 2604 may communicate information between each other using a communication framework 2606. The communications framework 2606 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 2602 and the servers 2604 may include various types of standard communication elements designed to be interoperable with the communications framework 2606, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 2602 and a server 2604 can be in the form of a data packet adapted to be transmitted between two or more computer processes. The data packet may include a cookie and/or associated contextual information, for example.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a logic device at least partially implemented in hardware; and
an application having a form manager component operative on the logic device to manage one or more forms for a user interface of the application,
the form manager component to generate a form with form information retrieved from a web service using a form information query,
the form information query comprising a data structure having a combination of static form configuration information and dynamic form configuration information,
the dynamic form configuration information having one or more dynamic form parameters and one or more dynamic query parameters,
the one or more dynamic form parameters and the one or more dynamic query parameters dynamically generated during runtime when the application is executing and used to dynamically retrieve the form information from the web service,
the form manager component operative to send the form information query arranged to retrieve the form information as a stateless request to the web service and send a second form information query arranged to retrieve new form information for the form as another stateless request to the web service, the second form information query including at least one dynamic query parameter comprising a form value from a first form value set of a first form field previously retrieved from the web service and used to retrieve the new form information, and
the form manager component further operative to receive the form information comprising the first form value set of the first form field from the web service and the new form information comprising a second form value set for presentation in a second form field of the form from the web service, extract the first form value set and the second form value set using extensible markup language (XML) path language (XPATH) statements and namespace definitions, and present the extracted first form value set and the extracted second form value set in the first form field and the second form field, respectively, of the form.

2. The apparatus of claim 1, the form manager component comprising a static form configuration module operative on the logic device to define the static form configuration information in a form of one or more static form parameters used to retrieve form information from the web service, the static form parameters stored before the application is executing.

3. The apparatus of claim 1, the form manager component comprising a form generator module operative on the logic device to generate the form for the user interface of the application, the form comprising one or more form fields capable of presenting form information.

4. The apparatus of claim 1, the form manager component operative to generate the form information query arranged to retrieve the form information for the first form field of the form from the web service using the static form configuration information, the static form configuration information comprising one or more static query parameters, with one of the static query parameters comprising a network address for the web service.

5. The apparatus of claim 1, the form manager component operative to send the form information query arranged to retrieve the form information for the first form field of the form from the web service using the static form configuration information, and receive the form information comprising the first form value set from the web service for presentation in the first form field of the form.

6. The apparatus of claim 1, the form manager component comprising a dynamic form configuration module operative on the logic device to define the dynamic form configuration information in a form of one or more dynamic form parameters, the dynamic form parameters dynamically retrieved during runtime when the application is executing.

7. The apparatus of claim 1, the form manager component operative to generate the form information query arranged to retrieve the form information for the first form field of the form from the web service using the dynamic form configuration information.

8. The apparatus of claim 1, the form manager component operative to generate the form information query arranged to retrieve the form information for the first form field of the form from the web service using the dynamic form configuration information, with one of the dynamic query parameters comprising a location value for the logic device.

9. The apparatus of claim 1, comprising a user interface component operative on the logic device to generate a user interface view with the form and the retrieved form information in the form for presentation on an electronic display.

10. The apparatus of claim 1, comprising a form viewer and an electronic display, the form viewer operative on the logic device to present a user interface view with the form and the retrieved form information in the form on the electronic display.

11. A computer-implemented method, comprising:
generating a form for a user interface of an application;
generating a form information query to retrieve form information from a web service for the form, the form information query comprising a data structure having a combination of static form configuration information and dynamic form configuration information;
defining the dynamic form configuration information in a form of one or more dynamic form parameters and one or more dynamic query parameters used to retrieve form information from the web service, the dynamic form parameters and the dynamic query parameters dynamically generated during runtime when the application is executing;
sending the form information query to the web service as a stateless request;
receiving form information in response to the form information query from the web service;
extracting a first form value set from the form information using extensible markup language (XML) path language (XPATH) statements and namespace definitions;
presenting the first form value set in a form field of the form on the user interface of the application;

sending a second form information query to the web service as another stateless request, the second form information query including at least one dynamic query parameter comprising a form value from the first form value set of the form field previously received from the web service;
receiving new form information comprising a second form value set in response to the second form information query from the web service;
extracting the second form value set from the new form information using XPATH statements and namespace definitions; and
presenting the extracted second form value set in a second form field of the form on the user interface of the application.

12. The computer-implemented method of claim 11, comprising processing the received form information from the web service prior to presenting the form information.

13. The computer-implemented method of claim 11, comprising defining the static form configuration information in a form of one or more static form parameters used to retrieve form information from the web service, the static form parameters stored before the application is executing.

14. The computer-implemented method of claim 11, comprising generating the form for the user interface of the application, the form comprising one or more form fields capable of presenting form information.

15. The computer-implemented method of claim 11, comprising generating the form information query arranged to retrieve form information for the form field of the form from the web service using the static form configuration information, the static form configuration information comprising one or more static query parameters, with one of the static query parameters comprising a network address for the web service.

16. The computer-implemented method of claim 11, comprising sending the form information query arranged to retrieve the form information for the form field of the form from the web service using the static form configuration information, and receive the form information comprising a first form value set from the web service for presentation in the form field of the form.

17. The computer-implemented method of claim 11, comprising generating the form information query arranged to retrieve the form information for the form field of the form from the web service using the dynamic form configuration information.

18. An article of manufacture comprising a non-transitory storage medium containing instructions that when executed enable a system to:
generate a form information query to retrieve information from a web service for a form of an application, the form information query comprising a data structure having a combination of static form configuration information and dynamic form configuration information;
define the dynamic form configuration information in a form of one or more dynamic form parameters and one or more dynamic query parameters used to retrieve form information from the web service, the dynamic form parameters and the dynamic query parameters dynamically generated during runtime when the application is executing;
send the form information query to the web service as a stateless request;
receive form information from the web service;

extract a first form value set from the form information using extensible markup language (XML) path language (XPATH) statements and namespace definitions;

present the extracted first form value set in a form field of the form;

send a second form information query to the web service as another stateless request, the second form information query including at least one dynamic query parameter comprising a form value from the first form value set of the form field previously received from the web service;

receive new form information from the web service;

extracting a second form value set from the new form information using XPATH statements and namespace definitions; and information; and present the extracted second form value set in a second form field of the form.

19. The article of claim 18, further comprising instructions that when executed enable the system to define the static form configuration information in a form of one or more static form parameters used to retrieve form information from the web service, the static form parameters stored before the application is executing.

20. The article of claim 18, further comprising instructions that when executed enable the system to generate the form for a user interface of the application, the form comprising one or more form fields capable of presenting form information.

21. The article of claim 18, further comprising instructions that when executed enable the system to generate the form information query arranged to retrieve the form information for the form field of the form from the web service using the static form configuration information, the static form configuration information comprising one or more static query parameters, with one of the static query parameters comprising a network address for the web service.

22. The article of claim 18, further comprising instructions that when executed enable the system to send the form information query arranged to retrieve the form information for the form field of the form from the web service using the static form configuration information, and receive the form information comprising a first form value set from the web service for presentation in the form field of the form.

23. The article of claim 18, further comprising instructions that when executed enable the system to generate the form information query arranged to retrieve the form information for the form field of the form from the web service using the dynamic form configuration information.

24. The article of claim 18, further comprising instructions that when executed enable the system to generate a user interface view with the form and the received form information in the form for presentation on a display.

25. The article of claim 18, further comprising instructions that when executed enable the system to present a user interface view with the form and the received form information in the form on a display.

* * * * *

UNITED STATES PATENT AND TRADEMARK OFFICE
CERTIFICATE OF CORRECTION

PATENT NO. : 9,524,283 B2
APPLICATION NO. : 13/221681
DATED : December 20, 2016
INVENTOR(S) : Todd C. Folsom et al.

Page 1 of 1

It is certified that error appears in the above-identified patent and that said Letters Patent is hereby corrected as shown below:

On the Title Page

Assignee Name, replace "SAS INSTITUTES INC." with -- SAS Institute Inc. --

Signed and Sealed this
Ninth Day of January, 2018

Joseph Matal
*Performing the Functions and Duties of the*
*Under Secretary of Commerce for Intellectual Property and*
*Director of the United States Patent and Trademark Office*